(12) United States Patent
Tsuruhara et al.

(10) Patent No.: US 8,132,866 B2
(45) Date of Patent: Mar. 13, 2012

(54) BRAKE HYDRAULIC PRESSURE CONTROL APPARATUS FOR MOTORCYCLE AND BRAKE HYDRAULIC PRESSURE CONTROL APPARATUS FOR VEHICLE

(75) Inventors: Ryuzo Tsuruhara, Nagoya (JP); Yutaka Hamamoto, Takahama (JP); Hiroaki Seto, Iwata (JP); Hiroyuki Inoue, Iwata (JP); Yoshinori Tsuji, Iwata (JP)

(73) Assignees: Advics Co., Ltd., Kariya, Aichi-Pref. (JP); Yamaha Hatsudoki Kabushiki Kaisha, Iwata, Shizuoka-Pref. (JP)

( * ) Notice: Subject to any disclaimer, the term of this patent is extended or adjusted under 35 U.S.C. 154(b) by 689 days.

(21) Appl. No.: 12/237,022

(22) Filed: Sep. 24, 2008

(65) Prior Publication Data

US 2009/0079258 A1    Mar. 26, 2009

(30) Foreign Application Priority Data

Sep. 26, 2007  (JP) .................................. 2007-249876
Sep. 8, 2008   (JP) .................................. 2008-230118

(51) Int. Cl.
*B60T 8/40* (2006.01)
*B60T 8/32* (2006.01)

(52) U.S. Cl. ................... 303/116.1; 303/119.1; 303/137

(58) Field of Classification Search ................ 303/9.61, 303/137, 155, 156, 157, 158, 113.1, 116.1, 303/119.1
See application file for complete search history.

(56) References Cited

U.S. PATENT DOCUMENTS

| | | | |
|---|---|---|---|
| 6,793,295 B2 * | 9/2004 | Sakamoto | ..................... 303/9.61 |
| 2007/0069577 A1 | 3/2007 | Nakaura et al. | |
| 2008/0001472 A1 * | 1/2008 | Terasaka | ......................... 303/11 |

FOREIGN PATENT DOCUMENTS

| | | |
|---|---|---|
| DE | 10 2006 000 302 A1 | 1/2007 |
| JP | H9-267736 A | 10/1997 |
| JP | H9-323634 A | 12/1997 |
| JP | 2005-81897 A | 3/2005 |
| JP | 2007-083814 A | 4/2007 |
| JP | 2007-091051 A | 4/2007 |

OTHER PUBLICATIONS

Official Action dated Apr. 20, 2011, issued by the German Patent Office in corresponding German Patent Application No. 10 2008 048 647.7-21, and English language translation of Official Action.
English-language translation of Japanese Notice of Rejection Reasons dated Nov. 1, 2011 issued in the corresponding Japanese Patent Application No. 2008-230118.

* cited by examiner

*Primary Examiner* — Thomas J Williams
(74) *Attorney, Agent, or Firm* — Buchanan Ingersoll & Rooney PC

(57) ABSTRACT

A brake hydraulic pressure control apparatus is provided with wheel cylinder pressure inference value acquisition means (step 402) for acquiring an inference value of the wheel cylinder pressure, master cylinder pressure inference value acquisition means (step 404) for acquiring an inference value of the master cylinder pressure by utilizing a wheel cylinder pressure inference initial value, reaction force compensation amount acquisition means (step 406) for acquiring a reaction force compensation amount which is a value depending on the variation of the master cylinder pressure caused by the flowing of brake fluid during an ABS control, and differential pressure inference value acquisition means (step 410) for acquiring an inference value of the differential pressure between the master cylinder pressure and the wheel cylinder pressure by adding the reaction force compensation amount to the difference between the master cylinder pressure inference value and the wheel cylinder pressure inference value.

20 Claims, 11 Drawing Sheets

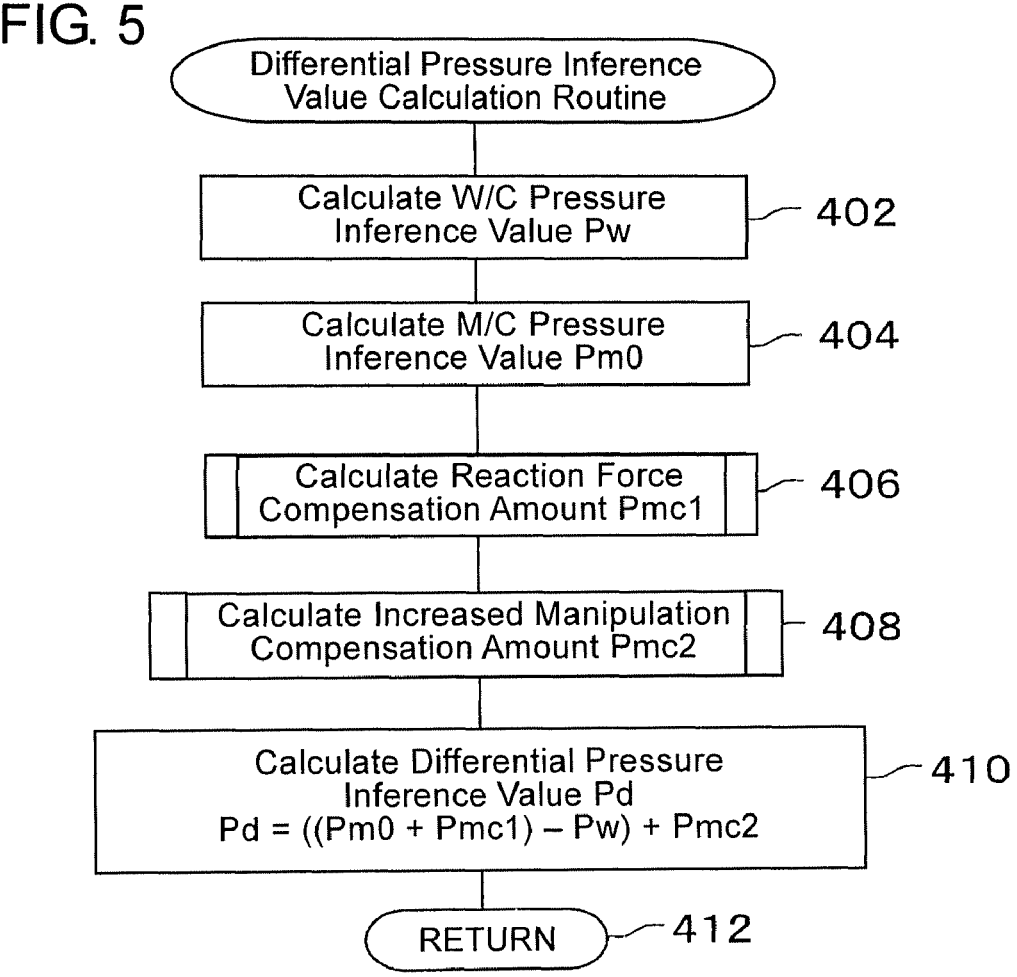

US 8,132,866 B2

BRAKE HYDRAULIC PRESSURE CONTROL APPARATUS FOR MOTORCYCLE AND BRAKE HYDRAULIC PRESSURE CONTROL APPARATUS FOR VEHICLE

INCORPORATION BY REFERENCE

This application is based on and claims priority under 35 U.S.C. 119 with respect to Japanese patent applications No. 2007-249876 filed on Sep. 26, 2007 and No. 2008-230118 filed on Sep. 8, 2008, the entire contents of which are incorporated herein by reference.

BACKGROUND OF THE INVENTION

1. Field of the Invention

The present invention relates to a brake hydraulic pressure control apparatus for a vehicle such as motorcycle or four-wheel vehicle.

2. Discussion of the Related Art:

Heretofore, as one type of brake hydraulic pressure control apparatuses for vehicle, there has been known one which is described in United States Patent Application Publication No. US 2007/0069577 A1 (equivalent of JP 2007-91051 A). In the known system, a hydraulic pump is held to be driven throughout an ABS control, in which during a pressure reduction control, a pressure increase valve is closed and a pressure reduction valve is opened, whereas during a pressure increase control, the pressure reduction valve is closed and the pressure increase valve is regulated to attain a desired pressure increase rate, whereby a wheel cylinder pressure is varied to control the braking force. More specifically, the differential pressure between a master cylinder pressure (M/C pressure) and a wheel cylinder pressure (W/C pressure) during the ABS control is appropriately inferred, and the pressure increase valve under a pressure increase control is regulated to attain a differential pressure inference value. The differential pressure inference value is obtained from the difference between a wheel cylinder pressure inference initial value (Pw0) and a wheel cylinder inference value (Pw) with consideration for a wheel cylinder pressure (Pg) that causes a wheel to lock. Further, during the ABS control, the hydraulic pump remains being driven from the beginning of the ABS control to the termination of the same.

SUMMARY OF THE INVENTION

Accordingly, it is a primary object of the present invention to provide an improved brake hydraulic pressure control apparatus which is capable of accurately calculating a differential pressure inference value by properly compensating the same for the variation in a master cylinder pressure, so that an appropriate brake force can be obtained by the application of an appropriate wheel cylinder pressure.

Briefly, according to a first aspect of the present invention, there is provided a brake hydraulic pressure control apparatus for a motorcycle, and the apparatus is applied to a brake actuator which comprises a front wheel pressure increase valve provided on a front wheel hydraulic circuit which is arranged between a front wheel master cylinder for generating a master cylinder pressure being a brake fluid pressure depending on the manipulation by the driver of a front wheel brake manipulation member and a front wheel cylinder; a front wheel pressure reduction valve provided on the front wheel hydraulic circuit between the front wheel cylinder and a front wheel reservoir; a front wheel hydraulic pump for drawing brake fluid from the front wheel reservoir to discharge the brake fluid to the front wheel hydraulic circuit between the front wheel master cylinder and the front wheel pressure increase valve; a rear wheel pressure increase valve provided on a rear wheel hydraulic circuit which is arranged, independently of the front wheel hydraulic circuit, between a rear wheel master cylinder for generating a master cylinder pressure being a brake fluid pressure depending on the manipulation by the driver of a rear wheel brake manipulation member and a rear wheel cylinder; a rear wheel pressure reduction valve provided on the rear wheel hydraulic circuit between the rear wheel cylinder and a rear wheel reservoir; and a rear wheel hydraulic pump for drawing brake fluid from the rear wheel reservoir to discharge the brake fluid to the rear wheel hydraulic circuit between the rear wheel master cylinder and the rear wheel pressure increase valve. The brake hydraulic pressure control apparatus for a motorcycle is provided with ABS control means which is capable of repetitively executing a pressure reduction control and a pressure increase control in this order, wherein the pressure reduction control is executed for reducing the wheel cylinder pressure being the brake fluid pressure in each wheel cylinder by controlling each pressure reduction valve with each pressure increase valve remaining in a closed state whereas the pressure increase control is executed for increasing each wheel cylinder pressure by controlling each pressure increase valve with each pressure reduction valve remaining in a closed state. The ABS control means comprises wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control; master cylinder pressure inference value acquisition means for acquiring an inference value of the master cylinder pressure by utilizing the wheel cylinder pressure inference initial value; reaction force compensation amount acquisition means for acquiring a reaction force compensation amount which is a value depending on the variation of the master cylinder pressure caused by the flowing of brake fluid during the ABS control; differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling each pressure increase valve based on the differential pressure inference value.

With the construction in the first aspect of the present invention, the wheel cylinder pressure inference value acquisition means acquires an inference value of the wheel cylinder pressure which varies throughout the ABS control, by utilizing a wheel cylinder pressure inference initial value which is an inference value of the wheel cylinder pressure at the start time of the ABS control, the master cylinder pressure inference value acquisition means acquires an inference value of the master cylinder pressure by utilizing the wheel cylinder pressure inference initial value, the reaction force compensation amount acquisition means acquires a reaction force compensation amount being a value which depends on the variation of the master cylinder pressure caused by the flowing of brake fluid during the ABS control, the differential pressure inference value acquisition means acquires an inference value of the differential pressure between the master cylinder pressure and the wheel cylinder pressure by adding the reaction force compensation amount to the difference between the master cylinder pressure inference value and the wheel cylinder pressure inference value, and the pressure increase valve control means controls each pressure increase valve based on the differential pressure inference value. Thus, when the master cylinder pressure varies largely as is true in a motorcycle for example, there can be acquired a reaction force compensation amount whose value meets the variation of the master cylinder pressure, and a differential pressure inference value can be calculated accurately by compensating the difference between the master cylinder pressure inference value and the wheel cylinder pressure inference value which difference remains approximately constant throughout the ABS control, by the use of the acquired reaction force compensation amount. As a consequence, each pressure increase valve can be controlled appropriately, so that an appropriate brake force can be obtained by controlling the wheel cylinder pressure appropriately.

In a second aspect of the present invention, there is provided an improved brake hydraulic pressure control apparatus for a vehicle, and the apparatus is applied to a brake actuator which comprises a pressure increase valve provided on a hydraulic circuit which is arranged between a master cylinder for generating a master cylinder pressure being a brake fluid pressure depending on the manipulation by the driver of a brake manipulation member and a wheel cylinder; a pressure reduction valve provided on the hydraulic circuit between the wheel cylinder and a reservoir; and a hydraulic pump for drawing brake fluid from the reservoir to discharge the brake fluid to the hydraulic circuit between the master cylinder and the pressure increase valve. The brake hydraulic pressure control apparatus is provided with ABS control means which is capable of repetitively executing a pressure reduction control and a pressure increase control in this order, wherein the pressure reduction control is executed for reducing a wheel cylinder pressure being the brake fluid pressure in the wheel cylinder by controlling the pressure reduction valve with the pressure increase valve remaining in a closed state whereas the pressure increase control is executed for increasing the wheel cylinder pressure by controlling the pressure increase valve with the pressure reduction valve remaining in a closed state. The ABS control means comprises wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control; master cylinder pressure inference value acquisition means for acquiring an inference value of the master cylinder pressure by utilizing the wheel cylinder pressure inference initial value; reaction force compensation amount acquisition means for acquiring a reaction force compensation amount which is a value depending on the variation of the master cylinder pressure caused by the flowing of brake fluid during the ABS control; differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling the pressure increase valve based on the differential pressure inference value.

With the construction in the second aspect of the present invention, substantially the same effects as described above can also be achieved in the brake hydraulic pressure control apparatus for a vehicle.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 5 is a flow chart of a differential pressure inference value calculation routine executed by the brake ECU;

Figure 6A:
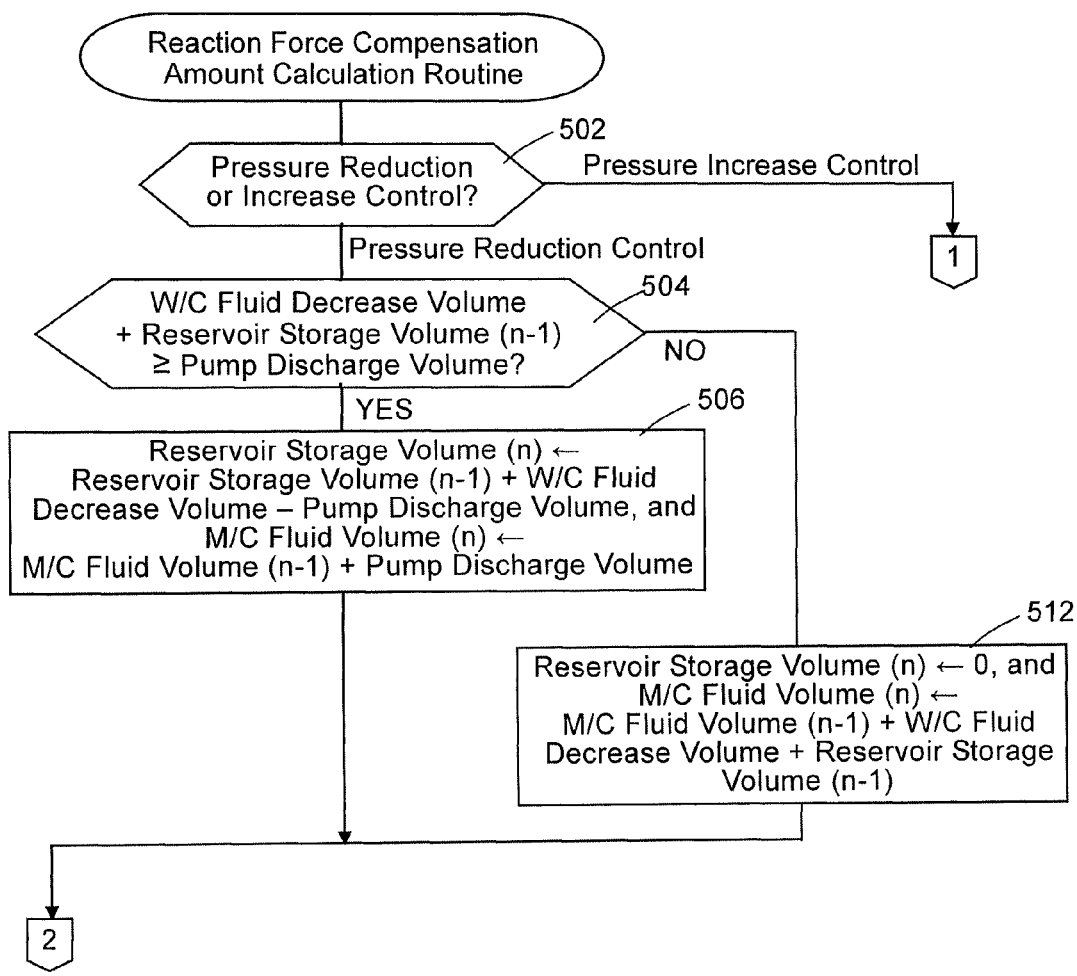
Figure 6B:
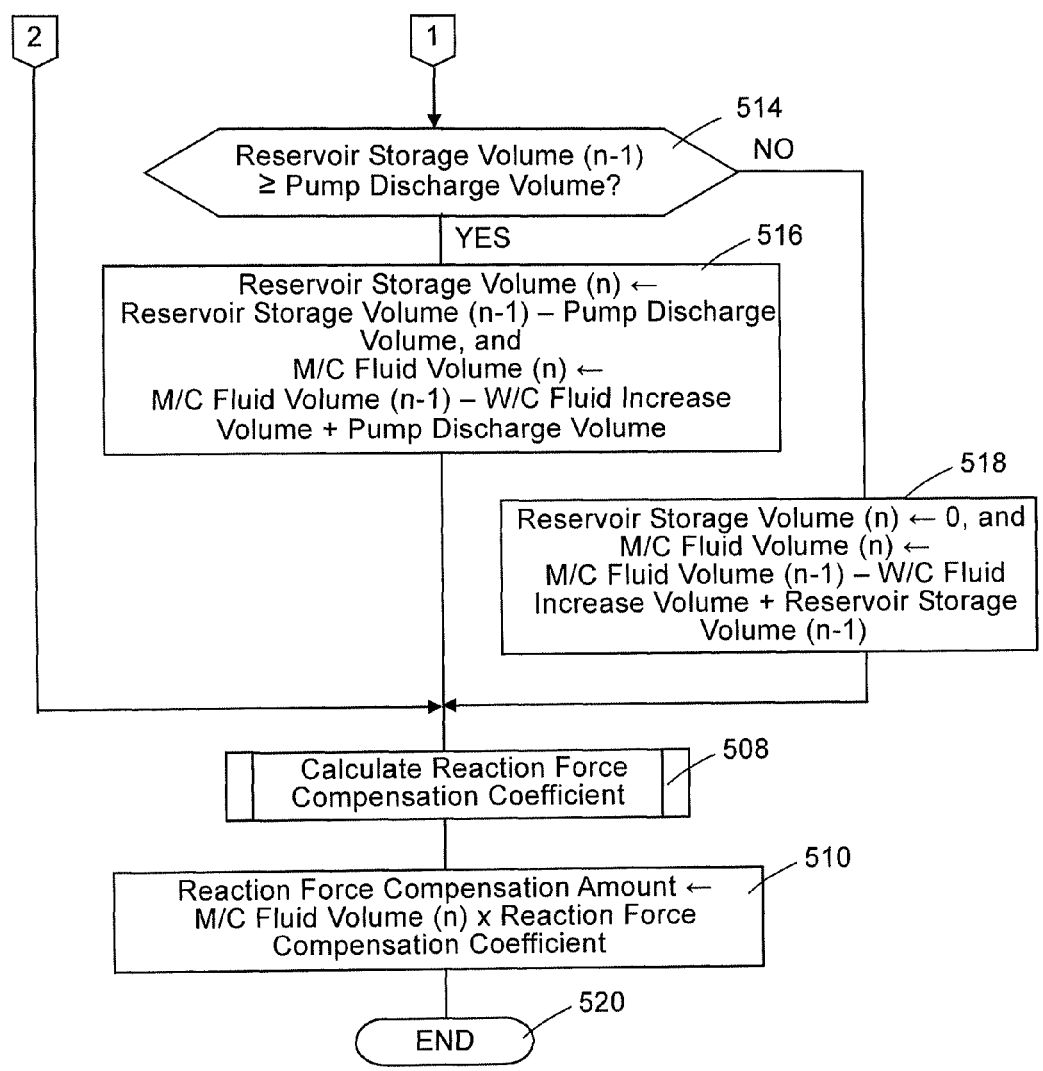
Figure 7:
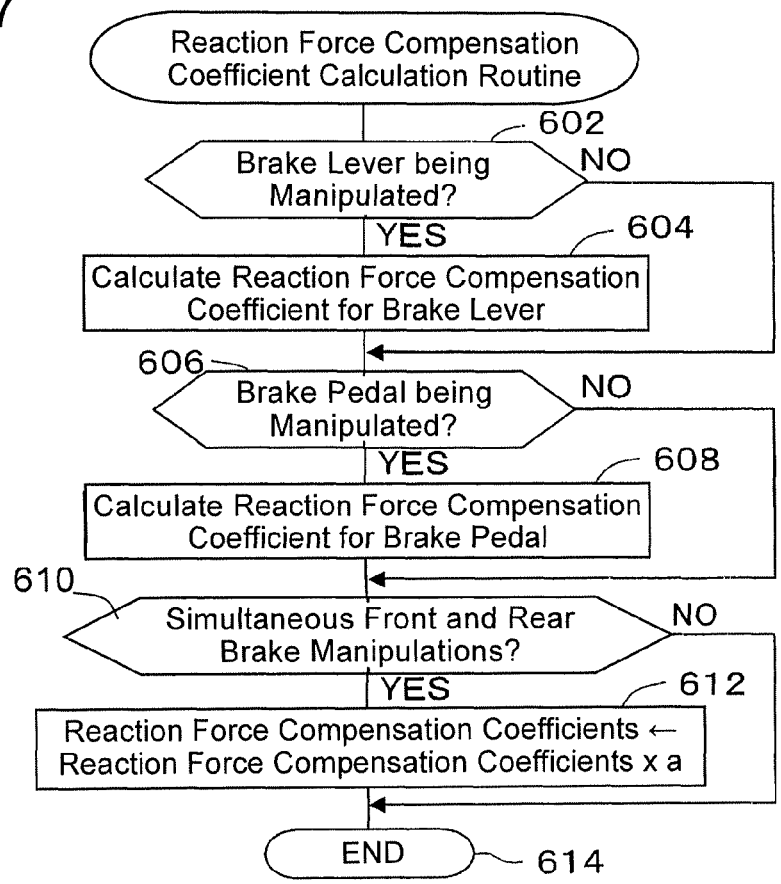
Figure 8:
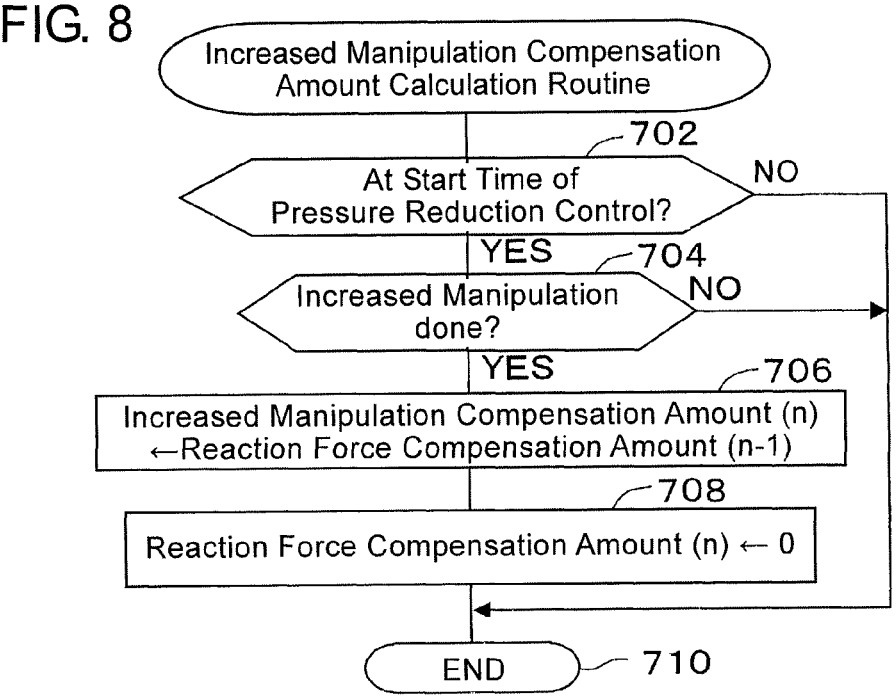
Figure 9:
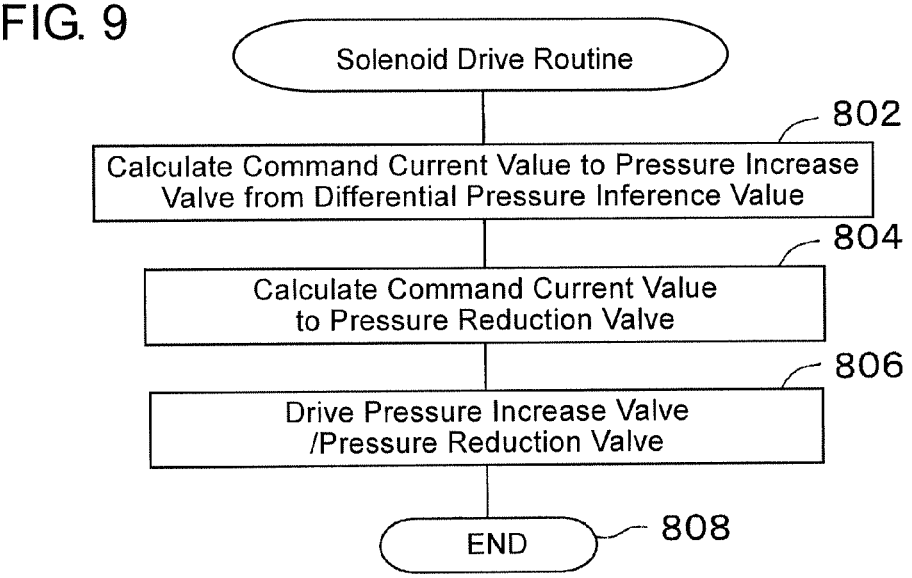
Figure 10:
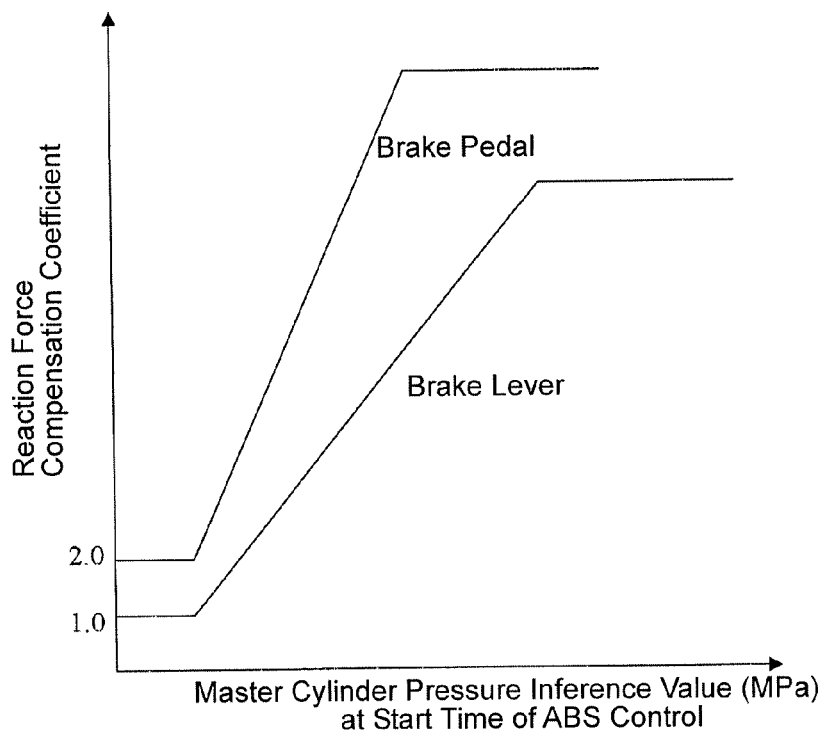
Figure 11:
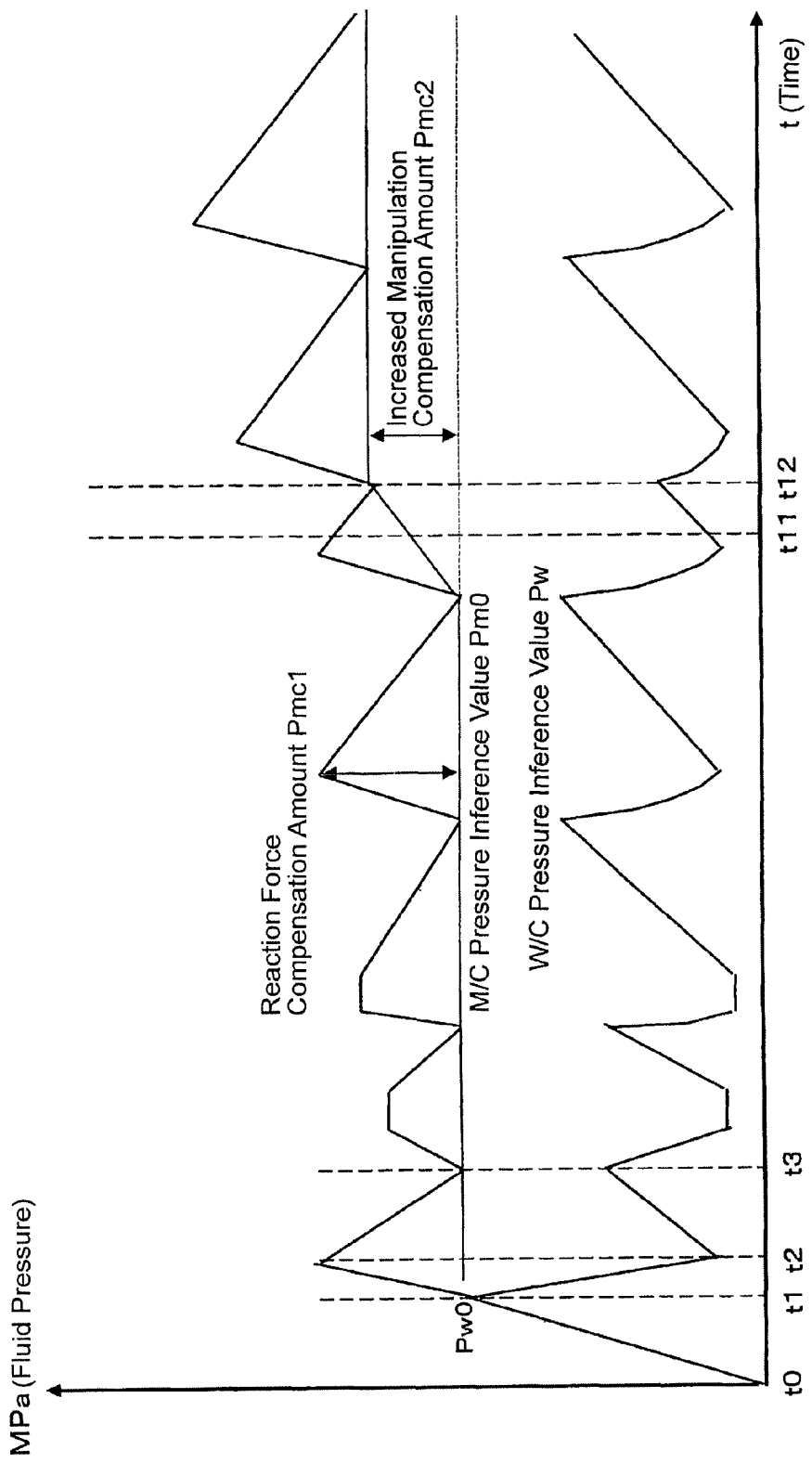
Figure 12:
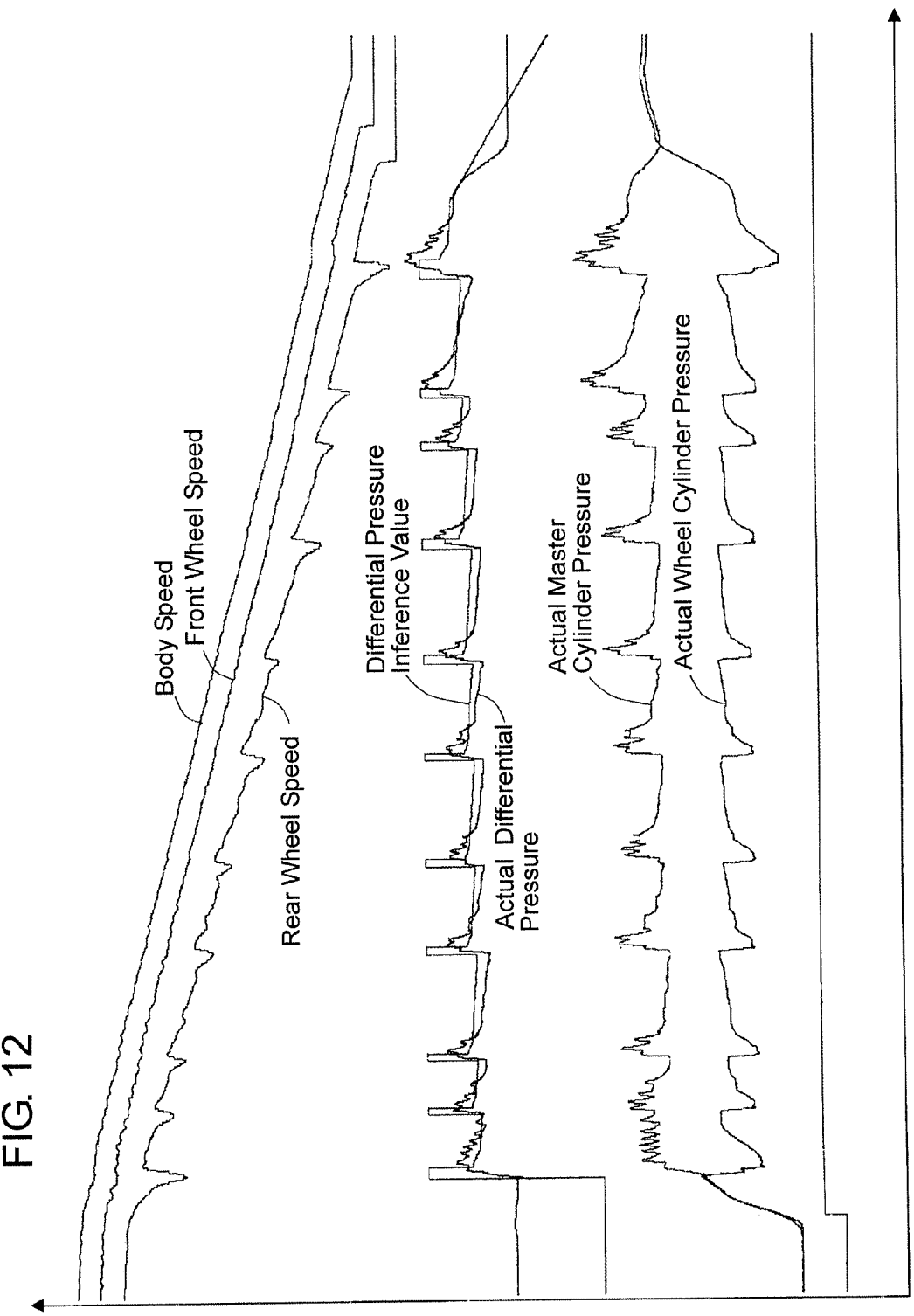
Figure 13:
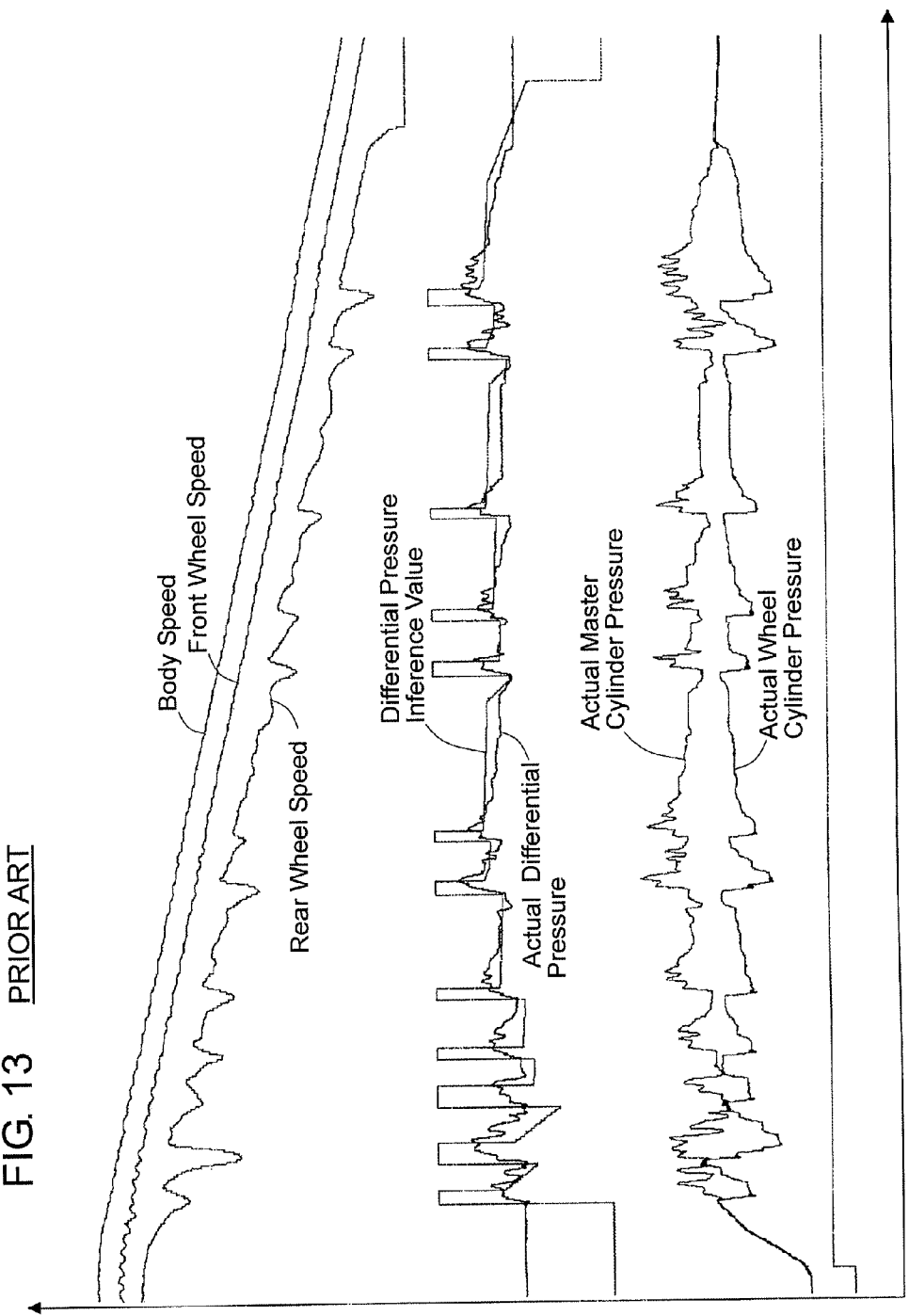

FIGS. 6(A) and 6(B) are partial flow charts collectively forming a reaction force compensation amount calculation routine executed by the brake ECU;

FIG. 7 is a flow chart of a reaction force compensation coefficient calculation routine executed by the brake ECU;

FIG. 8 is a flow chart of an increased manipulation compensation amount calculation routine executed by the brake ECU;

FIG. 9 is a flow chart of a solenoid drive routine executed by the brake ECU;

FIG. 10 is a map representing the relation between master cylinder pressure inference value at the start time of an ABS control and reaction force compensation coefficient, wherein two relations are shown for a brake lever and a brake pedal;

FIG. 11 is a time chart showing the time-dependant variations in the calculation results of wheel cylinder pressure inference value, master cylinder inference value and reaction force compensation amount in the embodiment according to the present invention;

FIG. 12 is a time chart demonstrating the operation effect in the embodiment according to the present invention and particularly showing the agreement of differential pressure inference value with actual differential pressure; and FIG. 13 is a time chart demonstrating the operation effect in the prior art and particularly showing the disagreement of differential pressure inference value with actual differential pressure.

DETAILED DESCRIPTION OF THE PREFERRED EMBODIMENT

Hereinafter, with reference to the accompanying drawings, a brake hydraulic pressure control apparatus for a motorcycle will be described as one embodiment of a brake hydraulic pressure control apparatus for a vehicle according to the present invention.

Figure 1:
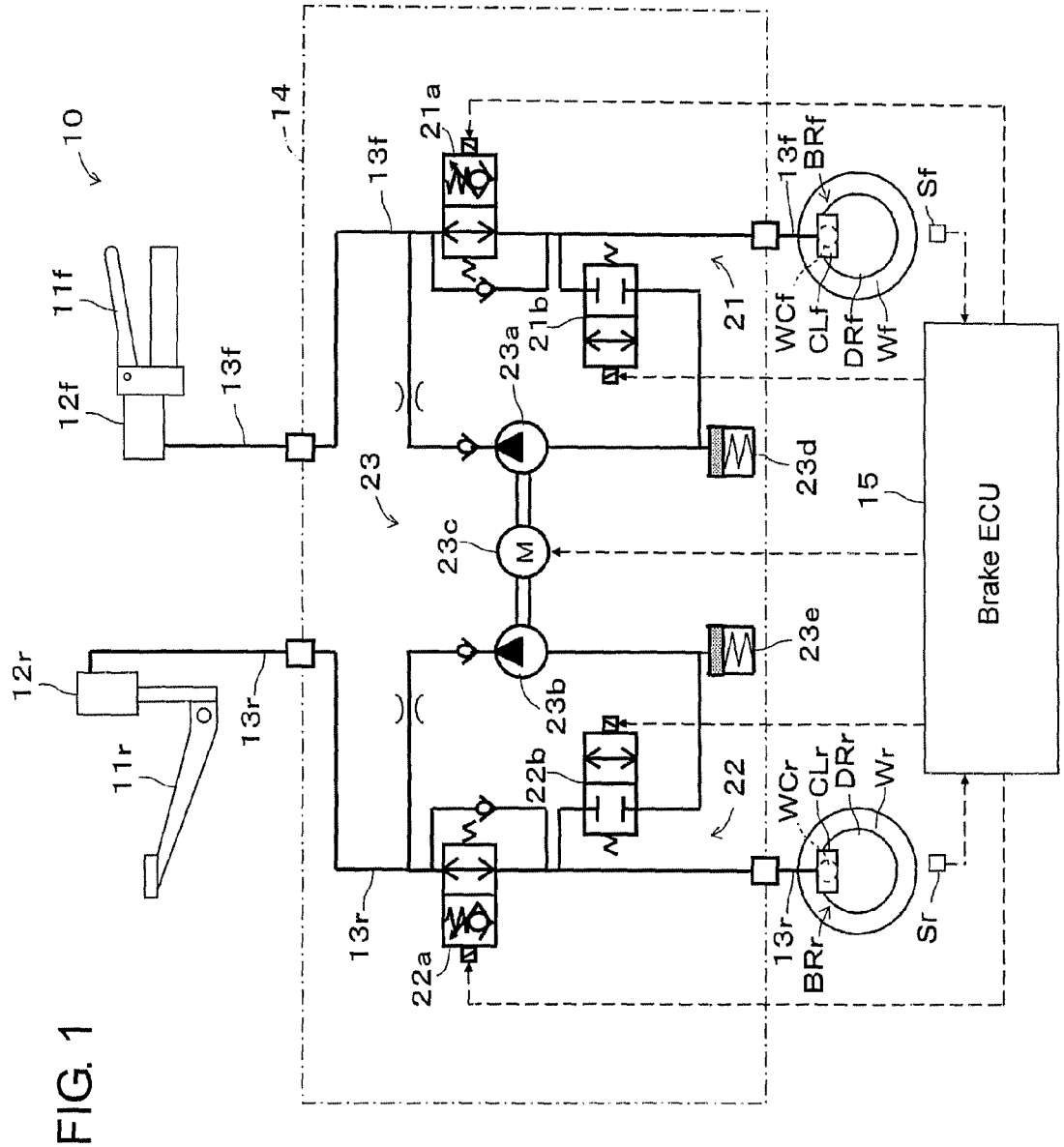
FIG. 1 is a schematic circuit diagram of a brake hydraulic pressure control apparatus for a motorcycle which embodies a brake hydraulic pressure control apparatus for a vehicle in one embodiment according to the present invention.

A hydraulic brake system 10 incorporating the brake hydraulic pressure control apparatus is for braking a motorcycle and as shown in FIG. 1, is provided with a brake lever (front brake manipulation member) 11$f$ arranged on a right end portion of a bar handle of the motorcycle, a front wheel master cylinder 12$f$ operatively connected to the brake lever 11$f$ for generating a brake hydraulic pressure in depending on a manipulation force applied by the rider to the brake lever 11$f$; a brake pedal (rear wheel brake manipulation member)

11r arranged as a right pedal of the motorcycle, and a rear wheel master cylinder 12r operatively connected to the brake pedal 11r for generating a brake hydraulic pressure in dependence on a manipulation force applied by the rider to the brake pedal 11r.

The hydraulic brake system 10 is provided with a front wheel brake BRf for applying a braking force to a front wheel Wf and a rear wheel brake BRr for applying a braking force to a rear wheel Wr. The front brake BRf is a disc brake composed of a disc rotor DRf and a caliper CLf. The caliper CLf is provided with a front wheel cylinder WCf capable of applying a braking force to the front wheel Wf. The rear wheel brake BRr is a disc brake composed of a disc rotor DRr and a caliper CLr. The caliper CLr is provided with a rear wheel cylinder WCr capable of applying a brake force to the rear wheel Wr.

The hydraulic brake system 10 is also provided with a front independent brake hydraulic circuit (front wheel hydraulic circuit) 13f which connects the front wheel master cylinder 12f to the front wheel cylinder WCf for applying a brake fluid pressure from the front wheel master cylinder 12f to the front wheel cylinder WCf, and a rear independent brake hydraulic circuit (rear wheel hydraulic circuit) 13r which connects the rear wheel master cylinder 12r to the rear wheel cylinder WCr for applying a brake fluid pressure from the rear wheel master cylinder 12r to the rear wheel cylinder WCr. The front independent brake hydraulic circuit 13f and the rear independent brake hydraulic circuit 13r are independent of each other.

The hydraulic brake system 10 is further provided with a brake actuator 14 having a front brake hydraulic pressure regulation section 21 and a rear brake fluid pressure regulation section 22 which are capable of respectively regulating brake pressures supplied to the respective wheel cylinders WCf, WCr, and a return brake fluid supply section 23.

The front brake hydraulic pressure regulation section 21 is composed of a pressure increase valve (front wheel pressure increase valve) 21a being a normally open linear electromagnetic valve and a pressure reduction valve (front wheel pressure reduction valve) 21b being a normally closed electromagnetic valve of a two-port, two-position switching type which are respectively arranged on the front independent brake hydraulic circuit 13f in the brake actuator 14.

The pressure increase valve 21a is capable of being controllably switched by a brake ECU (brake electronic control unit) 15 selectively to a communication state (non-differential pressure state) and a differential pressure state. The pressure increase valve 21a is ordinarily deenergized to remain in the communication sate, but is capable of holding the fluid pressure on the wheel cylinder WCf side at a higher pressure by a predetermined controlled differential pressure than the fluid pressure on the master cylinder 12f side when switched to a differential pressure state by being energized. This controlled differential pressure can be controlled by the brake ECU 15 in dependence on a controlled electric current applied to the pressure increase valve 21a. That is, when the controlled electric current is zero, the controlled differential pressure is held zero, and the controlled differential pressure is increased as the controlled electric current increases.

The pressure reduction valve 21b is interposed between the front wheel cylinder WCf and a front wheel reservoir 23d and is capable of bringing the front wheel cylinder WCf and the front wheel reservoir 23d selectively into communication or blocking in response to a command from the brake ECU 15.

Therefore, when the pressure increase valve 21a and the pressure reduction valve 21b are together in the deenergized state (the state shown in FIG. 1), communication is made between the front wheel master cylinder 12f and the front wheel cylinder WCf. That is, this causes a front W/C pressure being a brake fluid pressure in the front wheel cylinder WCf to be placed under a pressure increase control (front wheel pressure increase control). Further, when the differential pressure across the pressure increase valve 21a is controlled with the pressure reduction valve 21b remaining in the closed state, the front W/C pressure is placed under the pressure increase control (front wheel pressure increase control).

Further, when the pressure increase valve 21a and the pressure reduction valve 21b are respectively in the energized state and the deenergized state, the front W/C pressure can be retained (that is, the front wheel cylinder pressure is put under a pressure retention control (front wheel pressure retention control). In addition, when the pressure increase valve 21a and the pressure reduction valve 21b are together in the energized state, the front wheel cylinder WCf and the front wheel reservoir 23d are brought into communication. That is, the front W/C pressure is put under a pressure reduction control (front wheel pressure reduction control).

The rear brake hydraulic pressure regulation section 22 is composed of a pressure increase valve (rear wheel pressure increase valve) 22a being a normally open linear electromagnetic valve and a pressure reduction valve (rear wheel pressure reduction valve) 22b being a normally closed electromagnetic valve of a two-port, two-position switching type which are respectively arranged on a rear independent brake hydraulic circuit 13r in the brake actuator 14. The pressure increase valve 22a and the pressure reduction valve 22b respectively take the same constructions as the pressure increase valve 21a and the pressure reduction valve 21b of the aforementioned front brake hydraulic pressure regulation section 21. Thus, a rear W/C pressure being the brake fluid pressure in the rear wheel cylinder WCr can be selectively placed under a pressure increase control (rear wheel pressure increase control), a pressure retention control (rear wheel pressure retention control), and a pressure reduction control (rear wheel pressure reduction control).

The return brake fluid supply section 23 is composed of a front wheel pump 23a, a rear wheel pump 23b, an electric motor 23c, the front wheel reservoir 23d and a rear wheel reservoir 23e. The front wheel pump 23a draws brake fluid in the front wheel reservoir 23d and supplies the brake fluid between the front master cylinder 12f and the pressure increase valve 21a. The rear wheel pump 23b draws brake fluid in the rear wheel reservoir 23e and supplies the brake fluid between the rear master cylinder 12r and the pressure increase valve 22a. These pumps 23a, 23b are brought into drive at the same time as an ABS control is initiated for either the front wheel or the rear wheel, as described later in detail.

The front wheel reservoir 23d is a device for temporally storing the brake fluid drained from the front wheel cylinder WCf through the pressure reduction valve 21b. The rear wheel reservoir 23e is a device for temporally storing the brake fluid drained from the rear wheel cylinder WCr through the pressure reduction valve 22b.

With the aforementioned construction, the brake actuator 14 is capable of supplying the front wheel cylinder WCf with a front W/C pressure depending on the manipulation force of the brake lever 11f when the pressure increase valve 21a and the pressure reduction valve 21b are together in the deenergized state. Likewise, the brake actuator 14 is capable of supplying the rear wheel cylinder WCr with a rear W/C pressure depending on the manipulation force of the brake pedal 11r when the pressure increase valve 22a and the pressure reduction valve 22b are together in the deenergized state.

Further, the brake actuator 14 is capable of, regardless of the manipulation of the brake lever 11f, properly reducing or increasing the front W/C pressure through the aforementioned pressure reduction control, the pressure retention control and the pressure increase control by controlling the pressure increase valve 21a and the pressure reduction valve 21b. Thus, it becomes possible to perform a well-known front wheel ABS control. Similarly, the brake actuator 14 is capable of, regardless of the manipulation of the brake pedal 11r, properly reducing or increasing the rear W/C pressure through the aforementioned pressure reduction control, the pressure retention control and the pressure increase control by controlling the pressure increase valve 22a and the pressure reduction valve 22b. Thus, it becomes possible to perform a well-known rear wheel ABS control.

Further, the hydraulic brake system 10 is provided with wheel speed sensors Sf, Sr for respectively outputting pulse signals each time the front wheel Wf and the rear wheel Wr are rotated a predetermined angle, and the brake ECU 15.

The brake ECU 15 receives signals from the wheel speed sensors Sf, Sr and outputs drive signals to the electric motor 23c (hence, to drive the pumps 23a, 23b) and the electromagnetic valves 21a, 21b, 22a, 22b. The brake ECU 15 includes a microcomputer (not shown), which is provided with an input/output interface, a CPU, a RAM and a ROM (all not shown) connected thereto through bus lines. The CPU executes programs corresponding to flow charts shown in FIGS. 2 to 9, wherein in the execution of the ABS control, the CPU calculates differential pressure inference values accurately and executes the control of the pressure increase valves and the pressure reduction valves on the basis of the calculated differential pressure inference values. The RAM temporally stores variables necessary for the execution of the programs, and the ROM stores the programs.

(Operation)

Next, the operation of the hydraulic brake system 10 as constructed above will be described with reference to flow charts shown in FIGS. 2 to 9. When an ignition switch (not shown) of the motorcycle is turned on, the brake ECU 15 repetitively executes a main program shown in FIG. 2 at predetermined short time intervals (the control cycle time: e.g., 5 milliseconds). A flag FA referred to later is set to zero.

The brake ECU 15 at step 102 calculates respective wheel speeds VWf, VWr of the front and rear wheels Wf, Wr based on wheel speed signals which are outputted respectively from the wheel speed sensors Sf, Sr for the front and rear wheels Wf, Wr and at step 104, calculates wheel accelerations dVWf, dVWr of the front and rear wheels Wf, Wr which accelerations are differential values of the wheel speeds VWf, VWr. It is to be noted that symbol "*" as used in the drawings and the specification is a suffix which represents either of letters "f" or "r" corresponding to the front or rear wheel.

The brake ECU 15 at step 106 calculates a vehicle body speed VB based on the wheel speeds VWf, VWr of the front and rear wheels Wf, Wr previously calculated at step 102. For example, of the wheel speeds VWf, VWr, a larger one in value is calculated as the vehicle body speed VB.

The brake ECU 15 at step 108 calculates respective slip amounts $\Delta$VWf (=VB−VWf), $\Delta$VWr (=VB−VWr) based on the vehicle body speed VB calculated at step 106 and the wheel speeds VWf, VWr of the front and rear wheels Wf, Wr previously calculated at step 102.

Then, the brake ECU 15 at step 110 executes an ABS control on each of the front and rear wheels. Specifically, the brake ECU 15 executes an ABS control routine in accordance with a flow chart shown in FIG. 3 to judge the start and end of the ABS control and then executes a processing meeting the judgment result.

That is, unless the brake lever 11f (or the brake pedal 11r) is being manipulated by the rider (i.e., no brake is being applied), or unless a start condition for ABS control has not been satisfied though the manipulation is being done, the brake ECU 15 makes respective judgments of "YES" and "NO" at steps 202 and 204 respectively because the flag FA is zero this time, and proceeds the program to step 206 to terminate this routine once. Thus, in this case, without executing the ABS control, the brake ECU 15 holds the pressure increase valve 21a (or 22a) and the pressure reduction valve 21b (or 22b) both in the deenergized state to make the front wheel master cylinder 12f (or the rear wheel master cylinder 12r) communicate with the front wheel cylinder WCf (or the rear wheel cylinder WCr) and to block the front wheel cylinder WCf (or the rear wheel cylinder WCr) from the front wheel reservoir 23d (or the rear wheel reservoir 23e). Therefore, a front W/C pressure (or a rear W/C pressure) which depends on the manipulation force of the brake lever 11f (or the brake pedal 11r) is supplied to the front wheel cylinder WCf (or the rear wheel cylinder WCr).

In the present embodiment, the start condition for ABS control is that the slip amount $\Delta$VW* of the wheel W* becomes greater than a rear wheel pressure reduction start threshold value kV. Further, the flag FA indicates whether an ABS control is being executed or not, with the kind of control included. That is, the flag FA indicates the non-execution of the pressure reduction control by "0", the pressure reduction control in ABS control by "1", the pressure retention control in ABS control by "2", and the pressure increase control in ABS control (inclusive of pulse pressure increase output) by "3".

If the ABS control start condition is satisfied with the brake lever 11f (or the brake pedal 11r) being manipulated by the rider, it is meant that the ABS control start condition is satisfied with the flag FA being "0", and the brake ECU 15 makes a judgment of "YES" at each of steps 202 and 204 and advances the program to step 208 to execute an ABS control execution routine, as referred to later in detail. Then, the brake ECU 15 advances the program to step 206 to terminate this routine once. Therefore, in this case, the ABS control is initiated. During the execution of the ABS control, the flag FA is set to either one of numerals "1" to "3".

Further, if the satisfaction of the ABS control start condition continues even after the initiation of the ABS control, the flag FA indicates either one of the numerals "1" to "3", and the end condition for ABS control is not satisfied. Thus, the brake ECU 15 makes a judgment of "NO" at each of steps 202, 210 and advances the program to step 208 to execute the ABS control execution routine. Then, the brake ECU 15 advances the program to step 206 to terminate the present routine once. Accordingly, in this case, the execution of the ABS control is continued until the end condition for ABS control is satisfied.

Further, if the end condition for ABS control is satisfied in the course that the execution of the ABS control is continued, the brake ECU 15 makes judgments of "NO" and "YES" respectively at steps 202 and 210 because the flag FA indicates either one of the numerals "1" to "3". The brake ECU 15 advances the program to step 212 to set the flag FA to "0" and then, outputs an instruction for ending the ABS control at step 214. Then, the brake ECU 15 advances the program to step 206 to terminate the present routine once. Accordingly, in this case, the ABS control is terminated. It is to be noted that the end condition for ABS control is satisfied when the brake lever 11f (or the brake pedal 11r) outputs an OFF signal (i.e., when the rider terminates the manipulation of the brake lever 11f (or the brake pedal 11r), or when the pressure increase valve 21a is kept in the deenergized state over a predetermined period of time. The processing for ending the ABS control includes placing both of the pressure increase valve 21a and the pressure reduction valve 21b in the deenergized state and stopping the driving of the electric motor 23c (i.e., the front wheel pump 23a).

Next, the execution processing for the ABS control at the aforementioned step 208 will be described in detail. The ABS control is a control for repetitively executing a pressure reduction control, a pressure retention control and a pressure increase control which respectively reduces, retains and increases the W/C pressure for each wheel, in this order for the period from the time when the start condition for ABS control is satisfied, to the time when the end condition for ABS control is satisfied. In a modified form, the ABS control may be modified to repetitively execute the pressure reduction control and the pressure increase control in this order.

Figure 4:
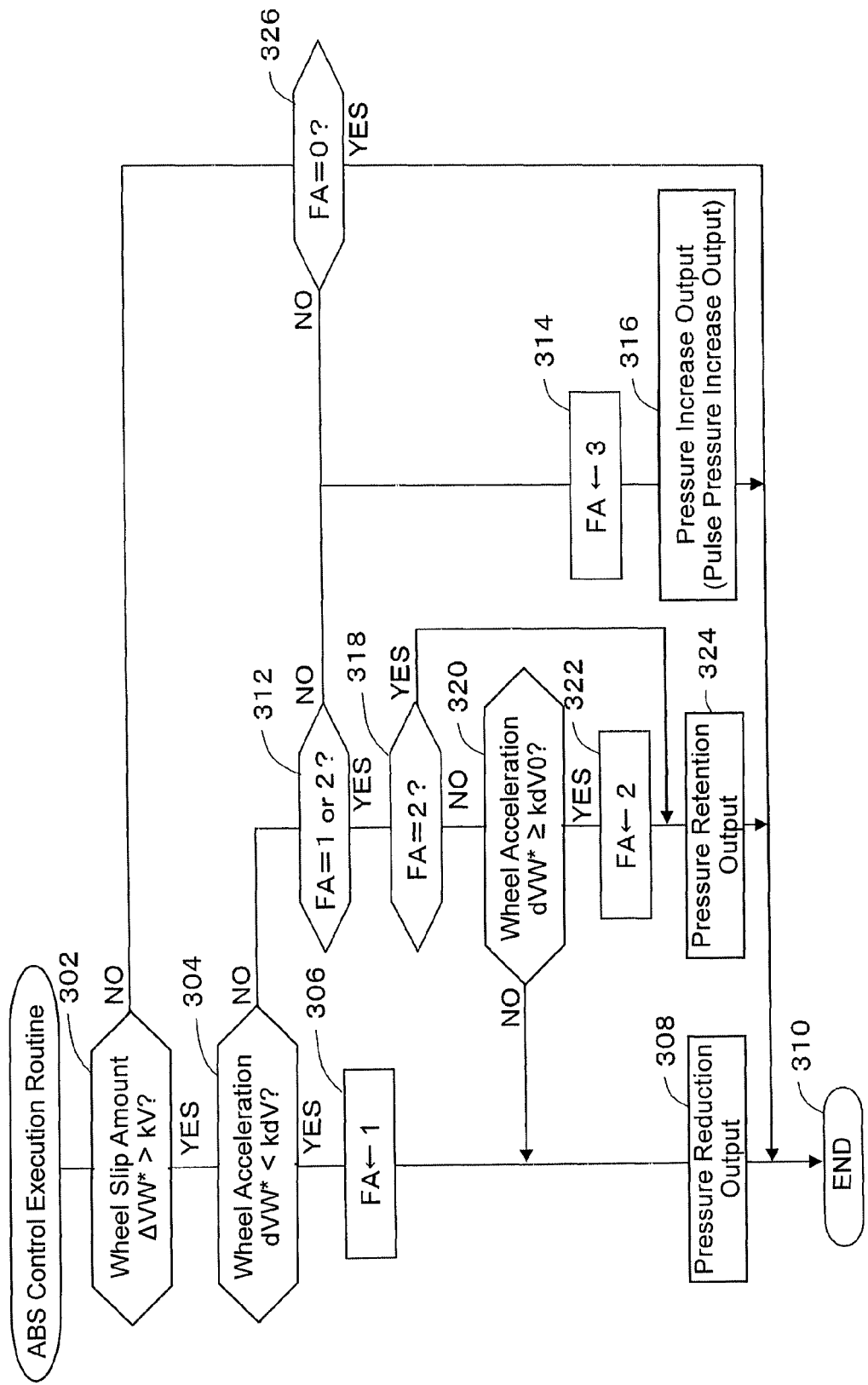
FIG. 4 is a flow chart of an ABS control execution routine executed by the brake ECU.

Specifically, the brake ECU executes an ABS control execution routine in accordance with a flow chart shown in FIG. 4 to execute the ABS control. First of all, because the slip amount ΔVW* of the wheel W* has become greater than the pressure reduction start threshold value kV right after the start of the ABS control is judged, the brake ECU at step 302 makes a judgment of "YES" to advance the program to step 304.

Here, the brake ECU 15 at step 304 judges whether the wheel acceleration dVW* is smaller than a judgment value kdV or not. If the wheel acceleration dVW* is smaller than the judgment value kdV, the brake ECU 15 makes a judgment of "YES" at step 304, sets the flag FA to "1" at step 306, and gives instructions to execute the pressure reduction control at step 308 before terminating the present routine once at step 310. If the wheel acceleration dVW* is equal to or greater than the judgment value kdV, on the contrary, because the pressure reduction control has not been initiated yet and because the flag FA indicates "0", the brake ECU 15 makes judgments of "NO" at steps 304 and 312, sets flag FA to "3" at step 314, and then gives instructions to execute the pressure increase control (pulse pressure increase control) at step 316 before terminating the present routine once at step 310.

That is, when the slip amount ΔVW* of the wheel W* becomes greater than the pressure reduction start threshold value kV for the first time after the initiation of the ABS control is judged and when the wheel acceleration dVW* at that time is smaller than the judgment value kdV, the brake ECU 15 immediately initiates the pressure reduction control. On the other hand, when the slip amount ΔVW* of the wheel W* becomes greater than the pressure reduction start threshold value kV for the first time after the initiation of the ABS control is judged and when the wheel acceleration dVW* at that time is equal to or greater than the judgment value kdV, the brake ECU 15 executes a pulse pressure increase control, waits until the wheel acceleration dVW* becomes smaller than the judgment value kdV, and then initiates the pressure reduction control.

When the pressure reduction control is initiated in this way, the brake force being applied to the wheel W* is decreased abruptly, whereby the wheel deceleration decreases during the pressure reduction control. In other words, the rate of change in the wheel acceleration indicates a tendency toward increase. If after the initiation of the pressure reduction control, the slip amount ΔVW* remains greater than the pressure reduction start threshold value kV and if the wheel acceleration dVW* which has been a smaller value than the judgment value kdV till then becomes equal to or greater than the judgment value kdV, the brake ECU 15 makes judgments of "YES" and "NO" respectively at steps 302 and 304. Since the flag FA at this time indicates "1", the brake ECU 15 makes judgments of "YES" and "NO" respectively steps 312 and 318, makes a judgment of "NO" at step 320 if the wheel acceleration dVW* is smaller than another or second judgment value kdV0 which is a greater value than the preceding or first judgment value kdV, and gives instructions to execute the pressure reduction control at step 308 before terminating the present routine once at step 310. That is, the brake ECU continues the pressure reduction control until the wheel acceleration dVW* which has become smaller than the first judgment value kdV is turned to increase, then becomes greater than the first judgment value kdV and reaches the second judgment value kdV0 which is greater than the first judgment value kdV.

On the other hand, if the wheel acceleration dVW* further increases to become equal to or greater than the second judgment value kdV0, the brake ECU 15 makes a judgment of "YES" at step 320, sets the flag FA to "2" at step 322 and gives instructions to execute the pressure retention control at step 324 before terminating the present routine once at step 310. That is, if after the initiation of the pressure reduction control, the wheel acceleration dVW* which has once become smaller than the first judgment value kdV becomes equal to or greater than the second judgment value kdV0, the brake ECU 15 moves from the pressure reduction control to initiate a pressure retention control.

When the pressure retention control is initiated in this way, the brake force which has been applied as it is decreased is held at a constant or fixed value, whereby the wheel deceleration increases during the pressure retention control. In other words, the rate of change in the wheel acceleration indicates a tendency toward decrease. If after the initiation of the pressure retention control, the slip amount ΔVW* is greater than the pressure reduction start threshold value kV and if the wheel acceleration dVW* is equal to or greater than the second judgment value kdV0, the brake ECU 15 makes judgments of "YES" and "NO" respectively at steps 302 and 304, makes judgments of "YES" at steps 312 and 318 because of the flag FA indicating "2", and gives instructions to execute the pressure retention control at step 324 before terminating the present routine once at step 310. That is, the brake ECU 15 continues the pressure retention control until the slip amount ΔVW* becomes smaller than the pressure reduction start threshold value kV.

If after the initiation of the ABS control, the slip amount ΔVW* of the wheel W* becomes smaller than the pressure reduction start threshold value kV in the course of the pressure retention control being continued, the brake ECU 15 makes judgments of "NO" at steps 302 and 326 because of the flag FA indicating "2", sets the flag FA to "3" at step 314, gives instructions to execute the pressure increase control (pulse pressure increase control) at step 316 before terminating the present routine once at step 310. Thus, the brake ECU 15 initiates the pressure increase control (a pulse pressure increase output control in this particular embodiment) and continues the pressure increase control until the next pressure reduction control is initiated.

Subsequently, the brake ECU 15 at step 112 shown in FIG. 2 calculates a differential pressure inference value which is an inference value of the pressure difference between the master cylinder (M/C) pressure and the wheel cylinder (W/C) pressure for the front wheel (or the rear wheel). Specifically, the brake ECU 15 executes a differential pressure inference value calculation routine in accordance with a flow chart shown in FIG. 5.

The brake ECU 15 at step 402 calculates and acquires an inference value (W/C pressure inference value Pw) of the W/C pressure which varies throughout the ABS control, by utilizing a W/C pressure inference initial value which is an inference value of the W/C pressure at the start time of an ABS control (W/C pressure inference value acquisition means).

Specifically, upon starting of the ABS control (i.e., at the start time of the pressure reduction performed for the first time), the brake ECU 15 reads the W/C pressure inference initial value Pw0 which is stored in advance. Preferably, the initial value Pw0 should be set to a lock pressure at which a lock occurs on a wheel, and should be set taking into account the magnitude of deceleration or the like.

After the start of the ABS control, the brake ECU 15 calculates a present W/C pressure inference value based on a W/C pressure inference value which was calculated last time and the kind of control (i.e., the rate of change in control). That is, in the pressure reduction control right after the start of the ABS control, the present W/C pressure inference value is taken as a value which is obtained by adding the product of a pressure reduction rate (a value stored in advance) and a control cycle time to the last calculated value (inclusive of the initial value). In the pressure retention control, the present W/C pressure inference value remains at the same value throughout the control. In the pressure increase control, the present W/C pressure inference value is taken as a value which is obtained by adding the product of a pressure increase rate (a value stored in advance) and a control cycle time to the last calculated value.

The brake ECU at step 404 calculates and acquires an inference value of the M/C pressure (i.e., M/C pressure inference value Pm0) by utilizing the W/C pressure inference initial value Pw0 (M/C pressure inference value acquisition means). Here, the M/C pressure inference value Pm0 is taken to be the same as the W/C pressure inference initial value Pw0 on the assumption that the M/C pressure during the ABS control changes in a range which is close to the W/C pressure at the start time of the ABS control which is executed at the first time.

Further, the brake ECU 15 at step 406 calculates and acquires a reaction force compensation amount Pmc1 being a value which depends on the variation in the M/C pressure caused by the flowing of brake fluid during the ABS control (reaction force compensation amount acquisition means). Specifically, the brake ECU 15 executes a reaction force compensation amount calculation routine in accordance with a flow chart collectively shown in FIGS. 6(A) and 6(B).

The brake ECU 15 at step 502 judges whether the ongoing ABS control is in course of the pressure reduction control, the pressure increase control or the pressure retention control. The brake ECU 15 advances the program to step 504 if the pressure reduction control is ongoing, but to step 514 (FIG. 6(B)) if the pressure increase control is ongoing.

In the ABS control, the pressure reduction control is started in the beginning, and the pressure increase control is then started, which are repetitively performed in this order thereafter. First of all, description will be made regarding the pressure reduction control. Although no brake fluid is in the reservoir 23d (or 23e) at the start time of the pressure reduction control which is executed for the first time, the outflow of brake fluid from the wheel cylinder WC* begins because the pressure reduction value (21b or 22b) is opened. The outflow volume of the brake fluid can be calculated from the difference between the last W/C pressure inference value and the present W/C pressure inference value. In this case, there can be used a map representing the relation between the W/C pressure and the flow volume by which brake fluid outflows from the wheel cylinder. The storage volume of the reservoir is set to "0" as the initial value.

The W/C pressure is highest at the time of the pressure reduction start and is reduced as the pressure reduction proceeds. Therefore, the outflow volume of the brake fluid is the largest at the time of the pressure reduction start. Further, the discharge flow volume of the pump is set to be smaller than the outflow volume at the time of the pressure reduction start. Accordingly, the brake ECU 15 makes a judgment of "YES" at step 504. That is, if during the pressure reduction control, the sum of the remaining volume of brake fluid in the reservoir 23d and the outflow volume of brake fluid from the wheel cylinder WCf to the reservoir 23d exceeds the discharge volume of the hydraulic pump 23a, the brake ECU 15 makes a judgment of "YES" at step 504.

Then, at step 506, the brake ECU 15 calculates an M/C flow volume inference value being an inference value of brake fluid in the master cylinder from the discharge volume of the hydraulic pump. Specifically, an M/C fluid volume (n) which is the present value of the M/C fluid volume inference value is calculated by adding the pump discharge volume to an M/C fluid volume (n-1) which is the last value of the M/C fluid volume inference value, and the M/C fluid volume (n) is stored. At the same time, a reservoir storage volume (n) which is the present value of the brake fluid storage volume is calculated by adding the outflow volume at the present time of brake fluid from the wheel cylinder WC* to a reservoir storage value (n-1) being the last time value of the storage volume of brake fluid in the reservoir 23d and then by subtracting from the sum the pump discharge volume. The reservoir storage volume (n) is stored for use in the calculation at the next time.

Then, at step 510 in FIG. 6(B), the brake ECU 15 calculates and acquires a reaction force compensation amount in dependence on the M/C fluid volume inference value (M/C fluid volume (n)) calculated this time, as described later in detail.

Next, if during the pressure reduction control, the sum of the remaining volume of brake fluid in the reservoir 23d and the outflow volume of brake fluid from the wheel cylinder WCf to the reservoir 23d is smaller than the discharge volume of the hydraulic pump 23a, there occurs a situation that the pressure reduction proceeds for example wherein the outflow volume of brake fluid from the wheel cylinder WCf to the reservoir 23d is reduced and wherein the remaining volume of brake fluid in the reservoir decreases. The situation will be described hereafter. In this case, the brake ECU 15 makes a judgment of "NO" at step 504.

Then, the brake ECU 15 at step 512 calculates an M/C fluid volume inference value being an inference value of the brake fluid volume in the master cylinder, from the remaining volume of brake fluid in the reservoir 23d and the outflow volume of brake fluid from the wheel cylinder WCf to the reservoir 23d. Specifically, an M/C fluid volume (n) being the present value of the M/C fluid volume inference value is calculated by adding the outflow volume (W/C fluid decrease volume) of brake fluid from the wheel cylinder WCf to the reservoir 23d and a reservoir storage value (n-1) to the M/C fluid volume (n-1) being the last value of the M/C fluid volume inference value. The W/C fluid decrease volume can be calculated in the same manner as described above, and the reservoir storage value (n-1) is the last value of the storage volume of brake fluid in the reservoir 23d. The M/C fluid volume (n) is stored. At the same time, the reservoir storage volume (n) being the present value of the brake fluid storage volume in the reservoir 23d is set to "0".

Then, at step 510, the brake ECU 15 calculates and acquires a reaction force compensation amount which depends on the M/C fluid volume inference value (M/C fluid volume (n)) calculated this time, as described later in detail.

Next, description will be made regarding the case wherein during the pressure increase control, the remaining volume of brake fluid in the reservoir 23d is more than the discharge volume of the hydraulic pump 23a. This is the case for example wherein a relatively much volume of brake fluid remains in the reservoir 23d because no long time elapsed from the start of the pressure increase control. In this case, the brake ECU 15 makes a judgment of "YES" at step 514.

Then, the brake ECU 15 at step 516 calculates an M/C fluid volume inference value being an inference value of the brake fluid volume in the master cylinder, from the inflow volume of brake fluid from the master cylinder 12f to the wheel cylinder WCf and the discharge volume of the hydraulic pump 23a. Specifically, the M/C fluid volume (n) being the present value of the M/C fluid volume inference value is calculated by subtracting from the M/C fluid volume (n-1) being the last value of the M/C fluid volume inference value the inflow volume (i.e., the W/C fluid increase volume) of brake fluid from the master cylinder 12f to the wheel cylinder WCf and by adding a pump discharge volume to the difference, and the M/C fluid volume (n) is stored. At the same time, a reservoir storage volume (n) being the present value of the brake fluid storage volume in the reservoir 23d is calculated by subtracting the pump discharge volume from the reservoir storage volume (n-1) being the last value of the brake fluid storage volume in the reservoir 23d. The reservoir storage volume (n) is stored for use in calculation at the next time.

Then, at step 510, the brake ECU 15 calculates and acquires a reaction force compensation amount depending on the M/C fluid volume inference value (M/C fluid volume (n)) calculated this time, as described later in detail.

Further, description will be made regarding the case wherein during the pressure increase control, the remaining volume of brake fluid in the reservoir 23d is less than the discharge volume of the hydraulic pump 23a. This is the case for example wherein the reservoir 23d has almost no remaining fluid therein. In this case, the brake ECU 15 makes a judgment of "NO" at step 514.

Then, the brake ECU 15 at step 518 calculates an M/C fluid volume inference value being an inference value of the brake fluid volume in the master cylinder, from the inflow volume of brake fluid from the master cylinder 12f to the wheel cylinder WCf and the remaining volume of brake fluid in the reservoir 23d. Specifically, the M/C fluid volume (n) being the present value of the M/C fluid volume inference value is calculated by subtracting from the M/C fluid volume (n-1) being the last value of the M/C fluid volume inference value the inflow volume (i.e., the W/C fluid increase volume) of brake fluid from the master cylinder 12f to the wheel cylinder WCf and by adding the last value of the storage volume in the reservoir 23d to the difference, and the M/C fluid volume (n) is stored. At the same time, the reservoir storage volume (n) being the present value of the brake fluid storage volume in the reservoir 23d is set to "0".

Then, at step 510, the brake ECU 15 calculates and acquires a reaction force compensation amount depending on the M/C fluid volume inference value (M/C fluid volume (n)) calculated this time, as described later in detail.

As described above, once the ABS control is started, the brake ECU 15 calculates an M/C fluid volume inference value (M/C fluid volume (n)) being an inference value of the brake fluid volume in the master cylinder and a reservoir storage volume (n) being the present value of the brake fluid storage volume, in succession in either of the pressure reduction control and the pressure increase control.

Further, the brake ECU 15 calculates a reaction force compensation coefficient at step 508. Specifically, the brake ECU 15 executes a reaction force compensation coefficient calculation routine in accordance with a flow chart shown in FIG. 7.

The brake ECU 15 at step 602 judges whether the brake lever 11f is being manipulated or not. When the ABS control is started by the manipulation of the brake lever 11f (i.e., when making a judgment of "YES" at step 602), the brake ECU 15 at step 604 calculates a reaction force compensation coefficient based on the previously stored M/C pressure inference value (the W/C pressure inference initial value) at the start time of the ABS control and by reference to a brake lever map shown in FIG. 10 which represents the relation between M/C pressure inference value at the start time of the ABS control and reaction force compensation coefficient. When the ABS control by the manipulation of the brake lever 11f is not started, the program is advanced to step 606.

Here, it is preferable that the larger the M/C pressure inference value (the W/C pressure inference initial value) at the start time of the ABS control is, the larger the reaction force compensation coefficient is set to be. As shown in FIG. 10, in either case of the brake manipulation member being the brake lever or the brake pedal, the larger the M/C pressure inference value (the W/C pressure inference initial value) at the start time of the ABS control is, the larger the reaction force compensation coefficient is set to be. Thus, since the reaction force compensation coefficient is set to be larger as the lock pressure increases, the reaction force compensation amount is set to a higher value with an increase in the lock pressure. Thus, even where the brake manipulation leading to the start of ABS control is abrupt, an accurate differential pressure inference value Pd can be inferred and acquired.

The brake ECU 15 at step 606 judges whether the brake pedal 11r is being manipulated or not. When the ABS control is started by the manipulation of the brake pedal 11r (i.e., when making a judgment of "YES" at step 606), the brake ECU 15 at step 608 calculates a reaction force compensation coefficient based on the previously stored M/C pressure inference value (the W/C pressure inference initial value) at the start time of the ABS control for the rear wheel and by reference to a brake pedal map also shown in FIG. 10 which represents the relation between M/C pressure inference value at the start time of the ABS control and reaction force compensation coefficient. When the ABS control by the manipulation of the brake pedal 11r is not started, the program is advanced to step 610.

Here, it is preferable that where the brake manipulation member is the brake lever manipulated by hand, the reaction force compensation coefficient is set to be somewhat smaller in comparison with that when the brake manipulation member is the brake pedal manipulated on foot. Because a strong manipulation force can be given on foot rather than by hand, the reaction force compensation amount should be set to be somewhat larger when the brake pedal is manipulated. With this setting, either the case that the brake pedal is manipulated on foot or the case that the brake lever is manipulated by hand, there can be acquired an appropriate reaction force compensation amount which meets the case.

Subsequently, the brake ECU at step 610 judges whether the front and rear brake manipulation members are being manipulated simultaneously or not. If the front and rear brake manipulation members are being manipulated simultaneously, the reaction force compensation coefficients acquired at steps 604 and 608 are set as new reaction force compensation coefficients by being multiplied with a constant (a: <1), whereas if either the front brake manipulation member or the rear brake manipulation member is being manipulated alone, the reaction force compensation coefficient acquired at step 604 or 608 is used as it is. With this processing, each of the reaction force compensation coefficients which are acquired when the ABS control is performed with both of the front and rear brake manipulation members being manipulated simultaneously is to be smaller than the reaction force compensation coefficient which is acquired when either of the brake manipulation members is being manipulated alone. That is, each of the reaction force compensation coefficients is set to be somewhat larger in the case that the ABS control is performed by the braking manipulation for either one wheel alone rather than in the case that the ABS control is performed by the simultaneous braking manipulations for the front and rear wheels.

Here, in the present hydraulic brake system 10, the front and rear wheel hydraulic circuits 13*f*, 13*r* are respectively provided with the front and rear hydraulic pumps 23*a*, 23*b*, which are driven by the common single electric motor 23*c* at a predetermined rotational speed. Therefore, where only one wheel is placed under the ABS control by the sole braking manipulation, a smaller number of the hydraulic circuits is placed under the ABS control (i.e., one in the case of the sole braking manipulation and two in the case of the simultaneous braking manipulations) in comparison with the case that both of the front and rear wheels are placed under the ABS control by the simultaneous braking manipulations, so that the load to the electric motor 23*c* is light to make the discharge pressure of the pump high. This causes the reaction force to become stronger, and therefore, it is required to set the reaction force compensation amount (i.e., the reaction force compensation coefficient) to a somewhat larger value. In other words, where the both of the front and rear wheels are placed under the ABS control by the simultaneous braking manipulations, each of the reaction forces becomes week in comparison with the case that the sole wheel is placed under the ABS control by the sole braking manipulation, and therefore, it is required to set the reaction force compensation amounts (i.e., the reaction force compensation coefficients therefor) to somewhat smaller values. With this processing, in either the case that the front and rear wheels are simultaneously placed under the ABS control or the case that one wheel alone is placed under the ABS control, it is possible to acquire each reaction force compensation amount appropriate to meet the case.

Thereafter, the brake ECU 15 advances the program to step 614 to terminate the present routine once.

Then, the brake ECU 15 advances the program to step 510 shown in FIG. 6(B) and calculates the reaction force compensation amount for each master cylinder by multiplying the reaction force compensation coefficient acquired at step 508 with the M/C fluid volume (n) calculated this time. As a consequence, it becomes possible to set a reaction force compensation amount in dependence on the fluid volume in each master cylinder. That is, the reaction force compensation amount for each master cylinder can be set to be larger if the fluid volume in each master cylinder is large, but can be set to be small if the fluid volume in each master cylinder is small.

Then, the brake ECU 15 advances the program to step 520 to terminate the present routine once.

By the way, FIG. 11 shows respective examples of the aforementioned W/C pressure inference value Pw, the M/C pressure inference value Pm, and the reaction force compensation amount Pmc1. FIG. 11 typically shows a situation that the brake lever 11*f* only is being manipulated, wherein it is assumed that the braking manipulation is started at time t0 and that the ABS control is started at time t1. The W/C pressure inference value Pw at time t1, that is, the W/C pressure inference initial value is indicated as Pw0.

The W/C pressure inference value Pw goes down from the ABS control start time (time t1) to time t2 under a pressure reduction control. When a switching is made at time t2 to a pressure increase control, the pressure reduction control is terminated, and the W/C pressure inference value Pw is increased until time t3 when the pressure reduction control is resumed. Subsequent to time t3, the pressure reduction control and the pressure increase control are executed repetitively (it may be the case that a pressure retention control is performed between the pressure reduction control and the pressure increase control). The W/C pressure inference value Pw is decreased and increased in dependence on the switching control.

Further, the M/C pressure inference value Pm is set to be close to the W/C pressure inference initial value Pw0.

During the pressure reduction control, the pressure increase valve 21*a* is held closed, and since the inference value of fluid volume in the master cylinder 12*f* increases in dependence on the discharge flow volume from the pump 23*a* to the master cylinder 12*f*, the reaction force compensation amount Pmc1 is increased with such increase. During the pressure increase control, on the contrary, the pressure increase valve 21*a* is opened, and since the inference value of fluid volume in the master cylinder 12*f* decreases in dependence on the flow volume from the master cylinder 12*f* to the wheel cylinder WCf as well as on the brake fluid volume existing in the master cylinder 12*f*, the reaction force compensation amount Pmc1 is decreased with such decrease. That is, the reaction force compensation amount Pmc1 is decreased if the W/C pressure inference value Pw increases, but is increased if the W/C pressure inference value Pw decreases.

Referring back again to the flow chart shown in FIG. 5, the brake ECU 15 advances the program to step 408 shown in FIG. 5 to calculate an increased manipulation compensation amount Pmc2. Specifically, the brake ECU 15 executes an increased manipulation compensation amount calculation routine in accordance with a flow chart shown in FIG. 8.

The brake ECU 15 at step 702 judges whether the present stage is the start time for the pressure reduction control or not, and at step 704, further judges whether or not, an increase in manipulation (i.e., a stepping increase or a gripping increase) has been made until the present stage. After the time (time t11 in FIG. 11) when the stepping increase is made, the differential pressure inference value Pd which has been set to be a value close to an actual differential pressure until then becomes smaller than the actual differential pressure. As a result, an abrupt increase of the wheel cylinder pressure occurs in the pressure increase control including time t11, and the time (time t12) to subsequently start the pressure reduction control comes earlier. This results in the immediate start of the next pressure reduction control after the pressure increase control is terminated in a shorter period of time. As a consequence, there occurs a phenomenon that the wheel speed is abruptly increased and decreased in a short period of time. In order to stop this phenomenon, it is necessary to set the differential pressure inference value Pd to a somewhat large value. It is an increased manipulation compensation amount Pmc2 that is a value added to the differential pressure inference value Pd for such purpose.

It is to be noted that the increase in manipulation (a stepping increase or a gripping increase) is judged to have been made if the wheel acceleration changes abruptly at the start time of the pressure reduction control (e.g., at time t12) and if the time period for the pressure increase control having been executed until then is shorter than a predetermined time period.

When judging that the increase in manipulation was made, the brake ECU 15 stores the last value (n-1) of the aforementioned reaction force compensation amount as the increased manipulation compensation amount at step 706 and sets the present value (n) of the reaction force compensation amount to "0" at step 708. With this processing, the differential pressure inference value can be set to be large by a predetermined value, and the differential pressure inference value can be calculated accurately even when the increase in manipulation of the brake manipulation member is made (for example, at time t11 shown in FIG. 11) during the ABS control. As a consequence, the pressure increase valve for each wheel can be controlled appropriately, so that an appropriate brake force can be obtained by appropriately controlling the W/C pressure for the wheel.

Then, the brake ECU advances the program to step 410 shown in FIG. 5 and calculates and acquires a differential pressure inference value Pd being an inference value of the differential pressure between the M/C pressure and the W/C pressure by adding the reaction force compensation amount Pmc1 and the increased manipulation compensation amount Pmc2 to the difference of the M/C pressure inference value Pm0 from the W/C pressure inference value Pw (differential pressure inference value acquisition means).

Then, the brake ECU 15 advances the program to step 412 to terminate the present routine once.

Figure 2:
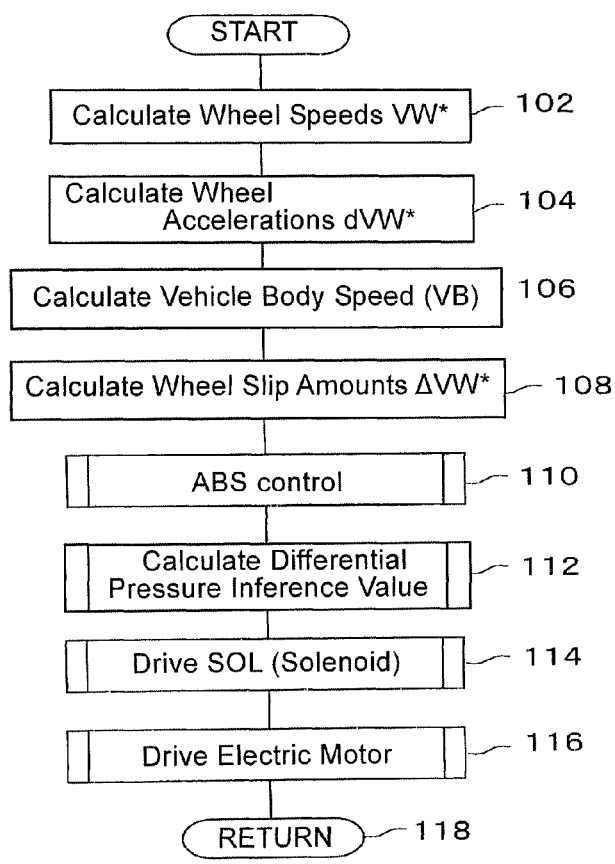
FIG. 2 is a flow chart of a main program of control programs executed by a brake ECU shown in FIG. 1.
Figure 3:
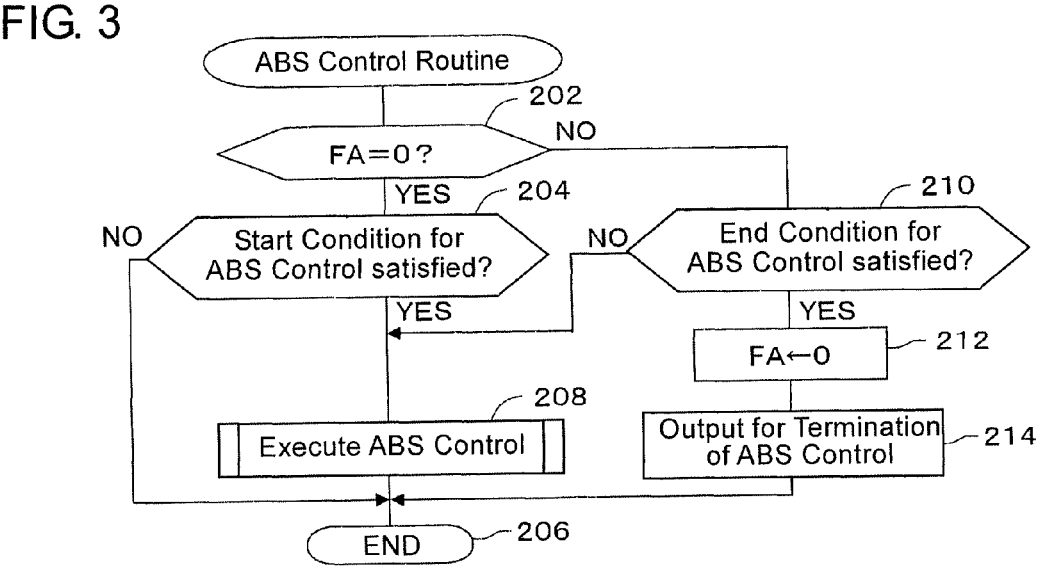
FIG. 3 is a flow chart of an ABS control routine executed by the brake ECU.

Thereafter, based on various outputs from the aforementioned ABS control of the front and rear wheels, the brake ECU 15 selectively executes the non-driving control and the driving control of the pressure increase valves 21*a*, 22*a* and the pressure reduction valves 21*b*, 22*b* at step 114 shown in FIG. 2 and executes the non-driving control and the driving control of the electric motor 23*c* (i.e., the non-driving control and the driving control of the pumps 23*a*, 13*b*) at step 116.

The brake ECU 15 at step 114 executes a solenoid drive routine in accordance with a flow chart shown in FIG. 9. That is, the brake ECU 15 at step 802 calculates a command current value to each pressure increase valve 21*a* (22*a*) from the differential pressure inference value Pd calculated previously. This can be done by using a map which represents the relation between differential pressure inference value and command current value. The brake ECU 15 at step 804 calculates a command current value to each pressure reduction valve 21*b* (22*b*) to bring each pressure reduction valve 21*b* (22*b*) into a driven state in the pressure reduction control or into an out-of-driven state in the pressure increase control. Then, the brake ECU 15 at step 806 drives the pressure increase valve 21*a* (22*a*) and the pressure reduction valve 21*b* (22*b*) by the use of the command values calculated at steps 802 and 804. Then, the brake ECU 15 advances the program to step 808 to terminate the present routine once.

Having been constructed as described above, the present embodiment can achieve the operational effect demonstrated by a time chart shown in FIG. 12. FIG. 12 shows the situation that the rear wheel Wr only is placed under the ABS control. That is, during the ABS control, an actual master cylinder pressure (actual M/C pressure) and an actual wheel cylinder pressure (actual W/C pressure) were actually measured, and an actual differential pressure was calculated from the actual M/C pressure and the actual W/C pressure. FIG. 12 shows the actual M/C pressure, the actual W/C pressure and the actual differential pressure so measured and calculated. FIG. 12 also shows the differential pressure inference value which was calculated through the aforementioned processing. As is clear from FIG. 12, the differential pressure inference value well coincides or agrees with the actual differential pressure in each pressure increase control. Thus, even when the M/C pressure varies, the differential pressure inference value can be compensated for the variation, and a desired pressure increase can be done appropriately. It should be noted that in FIG. 12, the differential pressure inference value during each pressure reduction control is set to a fixed value because it was not calculated.

As a compared example, FIG. 13 shows a differential pressure inference value which was calculated in the prior art processing method. FIG. 13 also shows an actual M/C pressure and an actual W/C pressure which were actually measured during each pressure increase control, and an actual differential pressure which was calculated from the actually measured values. As clear from FIG. 13, the differential pressure inference value does not agree with the actual differential pressure in almost all of the pressure increase controls. This means that when the M/C pressure varies, the differential pressure inference value cannot be compensated appropriately for the variation in the prior art processing method, and hence, a desired pressure increase cannot be controlled appropriately by the use of the differential pressure inference value which is calculated in the prior art processing method.

As apparent from the foregoing description, in the present embodiment, the W/C pressure inference value acquisition means (step 402) acquires an inference value of the W/C pressure which varies throughout the ABS control, by utilizing a W/C pressure inference initial value which is an inference value of the W/C pressure at the start time of the ABS control, the M/C pressure inference value acquisition means (step 404) acquires an inference value of the M/C pressure by utilizing the W/C pressure inference initial value, the reaction force compensation amount acquisition means (step 406) acquires a reaction force compensation amount being a value which depends on the variation of the M/C pressure caused by the flowing of brake fluid during the ABS control, the differential pressure inference value acquisition means (step 410) acquires an inference value of the differential pressure between the M/C pressure and the W/C pressure by adding the reaction force compensation amount to the difference between the M/C pressure inference value and the W/C pressure inference value, and the pressure increase valve control means (step 114) controls each pressure increase valve based on the differential pressure inference value. With this configuration, when the M/C pressure varies largely as is true in a motorcycle for example, there can be acquired a reaction force compensation amount whose value meets the variation of the M/C pressure, and a differential pressure inference value can be calculated accurately by compensating the difference between the M/C pressure inference value and the W/C pressure inference value which difference remains approximately constant throughout the ABS control, by the use of the acquired reaction force compensation amount. As a consequence, the pressure increase valve for each wheel can be controlled appropriately, so that an appropriate brake force can be obtained by appropriately controlling the W/C pressure to each such wheel.

Further, during each pressure increase control, if the remaining volume of brake fluid in each reservoir (23*d* or 23*e*) is more than the discharge volume of each hydraulic pump (23*a*, 23*b*), the reaction force compensation amount acquisition means calculates and acquires a reaction force compensation amount which meets an M/C fluid volume inference value which is an inference value of the brake fluid volume in the master cylinder (12*f* or 12*r*) and which is calculated from the inflow volume of brake fluid to each wheel cylinder (WC*) and the discharge volume of the hydraulic pump (23*a* or 23*b*) (step 516). Thus, when the remaining volume of brake fluid in each reservoir is more than the discharge volume of each hydraulic pump during each pressure increase control, the reaction force compensation amount can be appropriately calculated in dependence on the M/C fluid volume inference value, so that the differential pressure inference value can be calculated appropriately.

Further, during each pressure increase control, if the remaining volume of brake fluid in each reservoir (23d, 23e) is less than the discharge volume of each hydraulic pump (23a, 23b), the reaction force compensation amount acquisition means calculates and acquires a reaction force compensation amount in dependence on the M/C fluid volume inference value which is an inference value of the brake fluid volume in the master cylinder (12f, 12r) and which is calculated from the remaining volume of brake fluid in each reservoir and the inflow volume of brake fluid to each wheel cylinder (WC*) (step 518). Thus, when the remaining volume of brake fluid in each reservoir is less than the discharge volume of each hydraulic pump, the reaction force compensation amount can be appropriately calculated in dependence on the M/C fluid volume inference value, so that the differential pressure inference value can be calculated appropriately.

Further, during each pressure reduction control, if the sum of the remaining volume of brake fluid in each reservoir (23d, 23e) and the outflow volume of brake fluid from each wheel cylinder (WC*) is more than the discharge volume of each hydraulic pump (23a, 23b), the reaction force compensation amount acquisition means calculates and acquires a reaction force compensation amount in dependence on the M/C fluid volume inference value which is an inference value of the brake fluid volume in the master cylinder (12f, 12r) and which is calculated from the discharge volume of each hydraulic pump (step 506). Thus, when the sum of the remaining volume of brake fluid in the reservoir and the outflow volume of brake fluid from the wheel cylinder is more than the discharge volume of the hydraulic pump, the reaction force compensation amount can be appropriately calculated in dependence on the M/C fluid volume inference value, so that the differential pressure inference value can be calculated appropriately.

Further, during each pressure reduction control, if the sum of the remaining volume of brake fluid in each reservoir (23d, 23e) and the outflow volume of brake fluid from each wheel cylinder (WC*) is less than the discharge volume of each hydraulic pump (23a, 23b), the reaction force compensation amount acquisition means calculates and acquires a reaction force compensation amount in dependence on the M/C fluid volume inference value which is an inference value of the brake fluid volume in the master cylinder (12f, 12r) and which is calculated from the remaining volume of brake fluid in each reservoir and the outflow volume of brake fluid from each wheel cylinder (WC*) (step 512). Thus, when the sum of the remaining volume of brake fluid in the reservoir and the outflow volume of brake fluid from the wheel cylinder is less than the discharge volume of the hydraulic pump, the reaction force compensation amount can be appropriately calculated in dependence on the M/C fluid volume inference value, so that the differential pressure inference value can be calculated appropriately.

The reaction force compensation amount acquisition means calculates the reaction force compensation amount by multiplying a reaction force compensation coefficient with the M/C fluid volume inference value (step 510). With this processing, it can be done to easily acquire a reaction force compensation amount depending on the M/C fluid volume.

Further, the reaction force compensation coefficient is set to become a larger value as the M/C pressure inference value at the start time of ABS control increases, as represented in the map shown in FIG. 10. With this processing, there can be acquired a reaction force compensation amount which is appropriate to meet the degree of a braking deceleration from the time of the manipulation start of the brake manipulation member to the start time of the ABS control.

Further, the reaction force compensation coefficient for the brake manipulation member being a hand-manipulated brake lever is set to be somewhat smaller than that for the brake manipulation member being a foot-manipulated brake pedal, as represented in the map shown in FIG. 10. With this processing, even in either the case that the brake pedal is manipulated on foot or the case that the brake lever is manipulated by hand, there can be acquired a reaction force compensation amount which is appropriate to the case.

Further, when either one wheel alone of the front and rear wheels is placed under the ABS control, the reaction force compensation coefficient for the one wheel is set to be somewhat larger than that which is set when both of the front and rear wheels are simultaneously placed under the ABS control (steps 610, 612). With this processing, even in either the case that the both of the front and rear wheels are simultaneously placed under the ABS control or the case that one wheel alone is placed under the ABS control, there can be acquired a reaction force compensation amount which is appropriate to either case.

Further, when an increase in manipulation is made on either one of the brake manipulation members, the differential pressure inference value acquisition means sets the differential pressure inference value to be larger by a predetermined value (step 410). With this processing, even when an increase in manipulation is made on the brake manipulation member during the ABS control, the differential pressure inference value can be calculated accurately. As a consequence, the pressure increase valve associated with the one brake manipulation member can be controlled appropriately, so that an appropriate brake force can be obtained by appropriately controlling the W/C pressure to the wheel.

Further, the predetermined value is set to a reaction force compensation amount acquired at the start time of the pressure reduction control which is executed for the first time after the increase in manipulation (step 706). With this processing, even when an increase in manipulation is made in the ABS control, there can be acquired a reaction force compensation amount which is appropriate to the magnitude of the increase in manipulation.

It should be noted that the aforementioned pressure increase valves 21a, 22a may be constituted each by a normally open electromagnetic shut-off valve of a two-port, two-position type, in which case a PWM control is performed to control the pressure increase valve. Further, the aforementioned pressure reduction valves 21b, 22b may be linear electromagnetic valves.

Furthermore, although the present invention has been described taking an example of a brake hydraulic pressure control apparatus for a motorcycle, it is also applicable to a brake hydraulic pressure control apparatus for a vehicle such as, for example, a four-wheel vehicle.

Obviously, numerous modifications and variations of the present invention are possible in light of the above teachings. It is therefore to be understood that within the scope of the appended claims, the present invention may be practiced otherwise than as specifically described herein.

What is claimed is:

1. A brake hydraulic pressure control apparatus for a motorcycle applied to a brake actuator which comprises:
   a front wheel pressure increase valve provided on a front wheel hydraulic circuit which is arranged between a front wheel master cylinder for generating a master cylinder pressure being a brake fluid pressure depending on the manipulation by the driver of a front wheel brake manipulation member and a front wheel cylinder;
   a front wheel pressure reduction valve provided on the front wheel hydraulic circuit between the front wheel cylinder and a front wheel reservoir;
   a front wheel hydraulic pump for drawing brake fluid from the front wheel reservoir to discharge the brake fluid to the front wheel hydraulic circuit between the front wheel master cylinder and the front wheel pressure increase valve;
   a rear wheel pressure increase valve provided on a rear wheel hydraulic circuit which is arranged, independently of the front wheel hydraulic circuit, between a rear wheel master cylinder for generating a master cylinder pressure being a brake fluid pressure depending on the manipulation by the driver of a rear wheel brake manipulation member and a rear wheel cylinder;
   a rear wheel pressure reduction valve provided on the rear wheel hydraulic circuit between the rear wheel cylinder and a rear wheel reservoir; and
   a rear wheel hydraulic pump for drawing brake fluid from the rear wheel reservoir to discharge the brake fluid to the rear wheel hydraulic circuit between the rear wheel master cylinder and the rear wheel pressure increase valve;
   wherein the brake hydraulic pressure control apparatus is provided with ABS control means which is capable of repetitively executing a pressure reduction control and a pressure increase control in this order, wherein the pressure reduction control is executed for reducing the wheel cylinder pressure being the brake fluid pressure in each wheel cylinder by controlling each pressure reduction valve with each pressure increase valve remaining in a closed state whereas the pressure increase control is executed for increasing each wheel cylinder pressure by controlling each pressure increase valve with each pressure reduction valve remaining in a closed state; and
   wherein the ABS control means comprises:
   wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control;
   master cylinder pressure inference value acquisition means for acquiring an inference value of the master cylinder pressure by utilizing the wheel cylinder pressure inference initial value;
   reaction force compensation amount acquisition means for acquiring, during each pressure increase control, a reaction force compensation amount which is a value depending on the variation of the master cylinder pressure caused by the flowing of brake fluid during the ABS control, in a calculation method which is selected in dependence on the result of comparing a remaining volume of brake fluid in each reservoir with a discharge volume of each hydraulic pump;
   differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and
   pressure increase valve control means for controlling each pressure increase valve based on the differential pressure inference value.

2. The brake hydraulic pressure control apparatus as set forth in claim 1, wherein when the remaining volume of brake fluid in each reservoir is more than the discharge volume of each hydraulic pump during each pressure increase control, the reaction force compensation amount acquisition means calculates the reaction force compensation amount in dependence on a master cylinder fluid volume inference value which is an inference value of the brake fluid volume in the master cylinder and which is calculated from the inflow volume of brake fluid to each wheel cylinder and the discharge flow volume of each hydraulic pump.

3. The brake hydraulic pressure control apparatus as set forth in claim 1, wherein when the remaining volume of brake fluid in each reservoir is less than the discharge volume of each hydraulic pump during each pressure increase control, the reaction force compensation amount acquisition means calculates the reaction force compensation amount in dependence on a master cylinder fluid volume inference value which is an inference value of the brake fluid volume in the master cylinder and which is calculated from the remaining volume of brake fluid in each reservoir and the inflow volume of brake fluid to each wheel cylinder.

4. The brake hydraulic pressure control apparatus as set forth in claim 1, wherein when an increase in manipulation is given to each brake manipulation member, the differential pressure inference value acquisition means sets the differential pressure inference value to be larger by a predetermined value.

5. The brake hydraulic pressure control apparatus as set forth in claim 4, wherein the predetermined value is set to the reaction force compensation amount acquired at the start time of the pressure reduction control which is performed first after the increase in manipulation.

6. A brake hydraulic pressure control apparatus for a motorcycle applied to a brake actuator which comprises:
   a front wheel pressure increase valve provided on a front wheel hydraulic circuit which is arranged between a front wheel master cylinder for generating a master cylinder pressure being a brake fluid pressure depending on the manipulation by the driver of a front wheel brake manipulation member and a front wheel cylinder;
   a front wheel pressure reduction valve provided on the front wheel hydraulic circuit between the front wheel cylinder and a front wheel reservoir;
   a front wheel hydraulic pump for drawing brake fluid from the front wheel reservoir to discharge the brake fluid to the front wheel hydraulic circuit between the front wheel master cylinder and the front wheel pressure increase valve;
   a rear wheel pressure increase valve provided on a rear wheel hydraulic circuit which is arranged, independently of the front wheel hydraulic circuit, between a rear wheel master cylinder for generating a master cylinder pressure being a brake fluid pressure depending on the manipulation by the driver of a rear wheel brake manipulation member and a rear wheel cylinder;
   a rear wheel pressure reduction valve provided on the rear wheel hydraulic circuit between the rear wheel cylinder and a rear wheel reservoir; and a rear wheel hydraulic pump for drawing brake fluid from the rear wheel reservoir to discharge the brake fluid to the rear wheel hydraulic circuit between the rear wheel master cylinder and the rear wheel pressure increase valve;

wherein the brake hydraulic pressure control apparatus is provided with ABS control means which is capable of repetitively executing a pressure reduction control and a pressure increase control in this order, wherein the pressure reduction control is executed for reducing the wheel cylinder pressure being the brake fluid pressure in each wheel cylinder by controlling each pressure reduction valve with each pressure increase valve remaining in a closed state whereas the pressure increase control is executed for increasing each wheel cylinder pressure by controlling each pressure increase valve with each pressure reduction valve remaining in a closed state; and wherein the ABS control means comprises:

wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control:

master cylinder pressure inference value acquisition means for acquiring an inference value of the master cylinder pressure by utilizing the wheel cylinder pressure inference initial value;

reaction force compensation amount acquisition means for acquiring a reaction force compensation amount which is a value depending on the variation of the master cylinder pressure caused by the flowing of brake fluid during the ABS control;

differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling each pressure increase valve based on the differential pressure inference value;

wherein the reaction force compensation amount acquisition means calculates the reaction force compensation amount by multiplying a reaction force compensation coefficient with the master cylinder fluid volume inference value.

7. The brake hydraulic pressure control apparatus as set forth in claim 6, wherein the reaction force compensation coefficient is set to be a larger value as the master cylinder pressure inference value at the start time of the ABS control becomes larger.

8. The brake hydraulic pressure control apparatus as set forth in claim 6, wherein the reaction force compensation coefficient is set to be somewhat smaller when the brake manipulation member is a brake lever manipulated by hand than when the brake manipulation member is a brake pedal manipulated on foot.

9. The brake hydraulic pressure control apparatus as set forth claim 6, wherein the reaction force compensation coefficient is set to be somewhat larger when either one of the front and rear wheels is placed alone under the ABS control than when the front and rear wheels are simultaneously placed under the ABS control.

10. The brake hydraulic pressure control apparatus as set forth in claim 6, wherein when an increase in manipulation is given to each brake manipulation member, the differential pressure inference value acquisition means sets the differential pressure inference value to be larger by a predetermined value.

11. The brake hydraulic pressure control apparatus as set forth in claim 10, wherein the predetermined value is set to the reaction force compensation amount acquired at the start time of the pressure reduction control which is performed first after the increase in manipulation.

12. A brake hydraulic pressure control apparatus for a vehicle applied to a brake actuator which comprises:

a pressure increase valve provided on a hydraulic circuit which is arranged between a master cylinder for generating a master cylinder pressure being a brake fluid pressure depending on the manipulation by the driver of a brake manipulation member and a wheel cylinder;

a pressure reduction valve provided on the hydraulic circuit between the wheel cylinder and a reservoir; and a hydraulic pump for drawing brake fluid from the reservoir to discharge the brake fluid to the hydraulic circuit between the master cylinder and the pressure increase valve;

wherein the brake hydraulic pressure control apparatus is provided with ABS control means which is capable of repetitively executing a pressure reduction contra and a pressure increase control in this order, wherein the pressure reduction control is executed for reducing a wheel cylinder pressure being the brake fluid pressure in the wheel cylinder by controlling the pressure reduction valve with the pressure increase valve remaining in a closed state whereas the pressure increase control is executed for increasing the wheel cylinder pressure by controlling the pressure increase valve with the pressure reduction valve remaining in a closed state; and wherein the ABS control means comprises:

wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control;

master cylinder pressure inference value acquisition means for acquiring an inference value of the master cylinder pressure by utilizing the wheel cylinder pressure inference initial value;

reaction force compensation amount acquisition means for acquiring, during each pressure increase control, a reaction force compensation amount which is a value depending on the variation of the master cylinder pressure caused by the flowing of brake fluid during the ABS control, in a calculation method which is selected in dependence on the result of comparing a remaining volume of brake fluid in the reservoir with a discharge volume of the hydraulic pump;

differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling the pressure increase valve based on the differential pressure inference value.

13. The brake hydraulic pressure control apparatus as set forth in claim 12, wherein:

when the remaining volume of brake fluid in the reservoir is more than the discharge volume of the hydraulic pump during each pressure increase control, the reaction force compensation amount acquisition means calculates the reaction force compensation amount in dependence on a master cylinder fluid volume inference value which is an inference value of the brake fluid volume in the master cylinder and which is calculated from the inflow volume of brake fluid to the wheel cylinder and the discharge flow volume of the hydraulic pump; and when the remaining volume of brake fluid in the reservoir is less than the discharge volume of the hydraulic pump during each pressure increase control, the reaction force compensation amount acquisition means calculates the reaction force compensation amount in dependence on a master cylinder fluid volume inference value which is an inference value of the brake fluid volume in the master cylinder and which is calculated from the remaining volume of brake fluid in the reservoir and the inflow volume of brake fluid to the wheel cylinder.

14. A brake hydraulic pressure control apparatus for a motorcycle applied to a brake actuator which comprises:

a front wheel pressure increase valve provided on a front wheel hydraulic circuit which is arranged between a front wheel master cylinder for generating a master cylinder pressure being a brake fluid pressure depending on the manipulation by the driver of a front wheel brake manipulation member and a front wheel cylinder;

a front wheel pressure reduction valve provided on the front wheel hydraulic circuit between the front wheel cylinder and a front wheel reservoir;

a front wheel hydraulic pump for drawing brake fluid from the front wheel reservoir to discharge the brake fluid to the front wheel hydraulic circuit between the front wheel master cylinder and the front wheel pressure increase valve;

a rear wheel pressure increase valve provided on a rear wheel hydraulic circuit which is arranged, independently of the front wheel hydraulic circuit, between a rear wheel master cylinder for generating a master cylinder pressure being a brake fluid pressure depending on the manipulation by the driver of a rear wheel brake manipulation member and a rear wheel cylinder;

a rear wheel pressure reduction valve provided on the rear wheel hydraulic circuit between the rear wheel cylinder and a rear wheel reservoir; and a rear wheel hydraulic pump for drawing brake fluid from the rear wheel reservoir to discharge the brake fluid to the rear wheel hydraulic circuit between the rear wheel master cylinder and the rear wheel pressure increase valve;

wherein the brake hydraulic pressure control apparatus is provided with ABS control means which is capable of repetitively executing a pressure reduction control and a pressure increase control in this order, wherein the pressure reduction control is executed for reducing the wheel cylinder pressure being the brake fluid pressure in each wheel cylinder by controlling each pressure reduction valve with each pressure increase valve remaining in a closed state whereas the pressure increase control is executed for increasing each wheel cylinder pressure by controlling each pressure increase valve with each pressure reduction valve remaining in a closed state; and wherein the ABS control means comprises:

wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control;

master cylinder pressure inference value acquisition means for acquiring an inference value of the master cylinder pressure by utilizing the wheel cylinder pressure inference initial value;

reaction force compensation amount acquisition means for acquiring, during each pressure reduction control, a reaction force compensation amount which is a value depending on the variation of the master cylinder pressure caused by the flowing of brake fluid during the ABS control, in a calculation method which is selected in dependence on the result of comparing the sum of a remaining volume of brake fluid in each reservoir and an outflow volume of brake fluid from each wheel cylinder with a discharge volume of each hydraulic pump;

differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling each pressure increase valve based on the differential pressure inference value.

15. The brake hydraulic pressure control apparatus as set forth in claim 14, wherein when the sum of the remaining volume of brake fluid in each reservoir and the outflow volume of brake fluid from each wheel cylinder is more than the discharge volume of each hydraulic pump during each pressure reduction control, the reaction force compensation amount acquisition means calculates the reaction force compensation amount in dependence on a master cylinder fluid volume inference value which is an inference value of the brake fluid volume in the master cylinder and which is calculated from the discharge volume of the hydraulic pump.

16. The brake hydraulic pressure control apparatus as set forth in claim 14, wherein when the sum of the remaining volume of brake fluid in each reservoir and the outflow volume of brake fluid from each wheel cylinder is less than the discharge volume of each hydraulic pump during each pressure reduction control, the reaction force compensation amount acquisition means calculates the reaction force compensation amount in dependence on a master cylinder fluid volume inference value which is an inference value of the brake fluid volume in the master cylinder and which is calculated from the remaining volume of brake fluid in each reservoir and the outflow volume of brake fluid from each wheel cylinder.

17. The brake hydraulic pressure control apparatus as set forth in claim 14, wherein when an increase in manipulation is given to each brake manipulation member, the differential pressure inference value acquisition means sets the differential pressure inference value to be larger by a predetermined value.

18. The brake hydraulic pressure control apparatus as set forth in claim 17, wherein the predetermined value is set to the reaction force compensation amount acquired at the start time of the pressure reduction control which is performed first after the increase in manipulation.

19. A brake hydraulic pressure control apparatus for a vehicle applied to a brake actuator which comprises:

a pressure increase valve provided on a hydraulic circuit which is arranged between a master cylinder for generating a master cylinder pressure being a brake fluid pressure depending on the manipulation by the driver of a brake manipulation member and a wheel cylinder;

a pressure reduction valve provided on the hydraulic circuit between the wheel cylinder and a reservoir; and a hydraulic pump for drawing brake fluid from the reservoir to discharge the brake fluid to the hydraulic circuit between the master cylinder and the pressure increase valve;

wherein the brake hydraulic pressure control apparatus is provided with ABS control means which is capable of repetitively executing a pressure reduction control and a pressure increase control in this order, wherein the pressure reduction control is executed for reducing a wheel cylinder pressure being the brake fluid pressure in the wheel cylinder by controlling the pressure reduction valve with the pressure increase valve remaining in a closed state whereas the pressure increase control is executed for increasing the wheel cylinder pressure by controlling the pressure increase valve with the pressure reduction valve remaining in a closed state; and wherein the ABS control means comprises:

wheel cylinder pressure inference value acquisition means for acquiring an inference value of the wheel cylinder pressure which varies throughout the ABS control, by utilizing a wheel cylinder pressure inference initial value which is an inference value of the wheel cylinder pressure at the start time of the ABS control;

master cylinder pressure inference value acquisition means for acquiring an inference value of the master cylinder pressure by utilizing the wheel cylinder pressure inference initial value;

reaction force compensation amount acquisition means for acquiring, during each pressure reduction control, a reaction force compensation amount which is a value depending on the variation of the master cylinder pressure caused by the flowing of brake fluid during the ABS control, in a calculation method which is selected in dependence on the result of comparing the sum of a remaining volume of brake fluid in the reservoir and an outflow volume of brake fluid from the wheel cylinder with a discharge volume of the hydraulic pump;

differential pressure inference value acquisition means for acquiring an inference value of the differential pressure between the master cylinder pressure and the wheel cylinder pressure by adding the reaction force compensation amount to the difference between the master cylinder pressure inference value and the wheel cylinder pressure inference value; and pressure increase valve control means for controlling the pressure increase valve based on the differential pressure inference value.

20. The brake hydraulic pressure control apparatus as set forth in claim 19, wherein:

when the sum of the remaining volume of brake fluid in the reservoir and the outflow volume of brake fluid from the wheel cylinder is more than the discharge volume of the hydraulic pump during each pressure reduction control, the reaction force compensation amount acquisition means calculates the reaction force compensation amount in dependence on a master cylinder fluid volume inference value which is an inference value of the brake fluid volume in the master cylinder and which is calculated from the discharge volume of the hydraulic pump; and when the sum of the remaining volume of brake fluid in the reservoir and the outflow volume of brake fluid from the wheel cylinder is less than the discharge volume of the hydraulic pump during each pressure reduction control, the reaction force compensation amount acquisition means calculates the reaction force compensation amount in dependence on a master cylinder fluid volume inference value which is an inference value of the brake fluid volume in the master cylinder and which is calculated from the remaining volume of brake fluid in the reservoir and the outflow volume of brake fluid from the wheel cylinder.

* * * * *